United States Patent
Nishio et al.

(10) Patent No.: US 7,872,887 B2
(45) Date of Patent: Jan. 18, 2011

(54) DC-AC INVERTER POWERING A SINGLE PHASE COMMERCIAL POWER SYSTEM

(75) Inventors: Naoki Nishio, Tokyo (JP); Hirokazu Nakabayashi, Tokyo (JP); Hiroshi Ito, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 569 days.

(21) Appl. No.: 11/667,126

(22) PCT Filed: Jun. 7, 2006

(86) PCT No.: PCT/JP2006/311417

§ 371 (c)(1),
(2), (4) Date: May 7, 2007

(87) PCT Pub. No.: WO2007/097051

PCT Pub. Date: Aug. 30, 2007

(65) Prior Publication Data

US 2008/0304301 A1    Dec. 11, 2008

(30) Foreign Application Priority Data

Feb. 27, 2006    (JP) .............................. 2006-050038

(51) Int. Cl.
  *H02M 3/315* (2006.01)
(52) U.S. Cl. .............................. 363/97; 363/43; 363/65; 323/906
(58) Field of Classification Search .................. 363/65, 363/17, 132, 98, 40, 43, 97; 323/906, 266
See application file for complete search history.

(56) References Cited

U.S. PATENT DOCUMENTS

| 4,823,247 | A | * | 4/1989 | Tamoto | ........................ | 363/16 |
| 6,404,655 | B1 | * | 6/2002 | Welches | ....................... | 363/41 |
| 6,618,274 | B2 | * | 9/2003 | Boylan et al. | .................. | 363/17 |
| 2002/0085325 | A1 | | 7/2002 | Suzui et al. | | |

(Continued)

FOREIGN PATENT DOCUMENTS

DE    10249122 A1    5/2004

(Continued)

OTHER PUBLICATIONS

Supplementary European Search Report in corresponding European Patent Application No. 06757124.0-2207 dated Jun. 5, 2009, 10 pps.

(Continued)

*Primary Examiner*—Harry Behm
(74) *Attorney, Agent, or Firm*—Buchanan Ingersoll & Rooney PC

(57) ABSTRACT

A grounding wire from a commercial power system is connected to a series-connection end of a series connection between two capacitors connected in series between a positive electrode and a negative electrode. A current detector monitors an output current of an inverter unit in which four switching elements and two diodes convert voltages at both ends of the series circuit of the capacitors at three levels. An operation control circuit controls a generation of a PWM signal to be applied to the four switching elements, to minimize a difference between a current value detected by the current detector and a target current value.

5 Claims, 15 Drawing Sheets

U.S. PATENT DOCUMENTS

2002/0181258 A1 12/2002 Welches
2004/0164557 A1 8/2004 West

FOREIGN PATENT DOCUMENTS

| DE | 102004037446 | 6/2006 |
|---|---|---|
| JP | 9-56172 A | 2/1997 |
| JP | 9-163755 A | 6/1997 |
| JP | 11-18443 A | 1/1999 |
| JP | 2001-103768 A | 4/2001 |
| JP | 2002-335632 A | 11/2002 |
| JP | 2004-173349 A | 6/2004 |

OTHER PUBLICATIONS

Myrzik et al, "String and Module Integrated Inverters for Single-Phase Grid Connected Photovoltaic Systems—A Review", Power Tech 2003 IEEE Conference Proceedings Powertech, vol. 2, Jun. 23, 2003, XP-002523862, 8 pps.

* cited by examiner

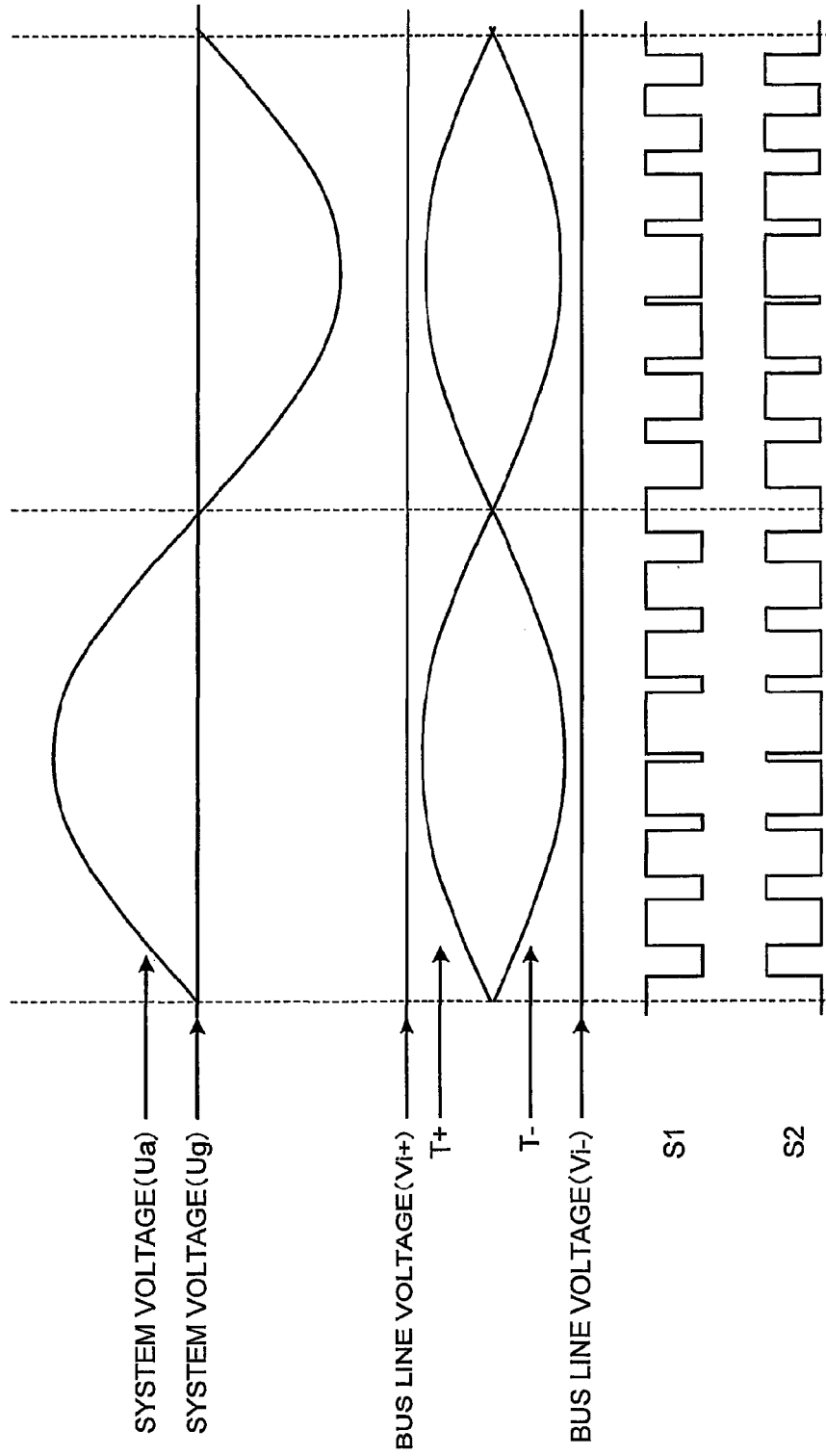

US 7,872,887 B2

DC-AC INVERTER POWERING A SINGLE PHASE COMMERCIAL POWER SYSTEM

TECHNICAL FIELD

The present invention relates to a power converting apparatus for system connection that converts direct-current power generated by a direct-current power generation facility into alternate-current power, and supplies the alternate current to a commercial power system, and more particularly, to a power converting apparatus for system connection that is applied to a commercial power system of which one phase is a grounding wire.

BACKGROUND ART

In recent years, development of a power generation system using a solar cell and a fuel cell having little influence on the environment is being positively progressed from the viewpoint of global environmental protection. In this power generation system, a power converting apparatus for system connection as an inverter device converts generated direct power into alternate-current power corresponding to frequency and voltage of a commercial power system, and supplies this alternate-current power to the commercial power system (that is, converted into an adverse current). An outline of a power converting apparatus for system connection that is conventionally used when a single phase is a commercial power system as a grounding wire is explained below with reference to FIG. 10 to FIG. 15. A case that a direct current voltage generated by the direct-current power generation facility is higher than a system voltage (wave crest value), that is, when a booster circuit is not used, is explained.

FIG. 10 is a block diagram of a configuration example (part one) of a conventional power converting apparatus for system connection. FIG. 11 is a relevant waveform diagram for explaining the operation of the power converting apparatus for system connection shown in FIG. 10. FIG. 10 is an example of a configuration of a connection inverter using a full bridge. Namely, in FIG. 10, when a direct-current power source as a direct-current power generation facility is a solar cell, grounded capacitance (stray capacitance) is present between a positive electrode side and the earth and between a negative electrode side and the earth, respectively. A system power source U is a commercial power system having one phase as a grounding wire. In this commercial power system, a grounded phase Ug of the system power source U is grounded, and a grounding wire of the grounded phase Ug is wired to a consumer, together with the power supply wire of a non-grounded phase Ua.

A high-voltage bus line P is connected to a positive electrode (voltage Vi+) of the direct-current power source E, and a low-voltage bus line N is connected to a negative electrode (voltage Vi−). A smoothing capacitor C1 is connected to between the high-voltage bus line P and the low-voltage bus line N. Two sets "S1, S2" and "S3, S4" of two switching elements connected in series are connected in parallel between the high-voltage bus line P and the low-voltage bus line N. A backflow diode D is connected inversely parallel to each switching element.

The switching elements S1 to S4 are IGBTs (Insulated Gate Bipolar Transistors), for example, and are on/off driven by a PWM signal from an operation control circuit not shown. A total of the switching elements S1 to S4 and the operation control circuit not shown that drive controls these switching elements S1 to S4 is an inverter controller.

One end of a reactor L1 is connected to an end of the series connection between the switching elements S1, S2 at the system power source U side. The other end of the reactor L1 is connected to one end of a capacitor C2 and the non-grounded phase Ua of the system power source U. One end of a reactor L2 is connected to an end of the series connection (inverter output side) between the switching elements S3, S4 at the direct-current power source E side. The other end of the reactor L2 is connected to the other end of the capacitor C2 and the grounded phase Ug of the system power source U. The reactor L1, the capacitor C2, the reactor L2, and the capacitor C2 constitute a low-pass filter.

In FIG. 11, a non-grounded phase system voltage (expressed as "Ua") is a sinusoidal wave vertically symmetrical based on a grounded phase system voltage (expressed as "Ug"). Among the switching elements S1 to S4 of the inverter controller, a set of the switching elements "S1, S4" and a set of the switching elements "S2, S3" alternately carry out an on/off operation based on a predetermined PWM signal in synchronism with a positive half cycle and a negative half cycle of the non-grounded phase system voltage Ua, thereby switching a voltage between bus lines. As a result, an alternate current voltage as a smooth sinusoidal wave similar to the non-grounded phase system voltage Ua is generated in low-pass filters "L1, C2" and "L2, C2", and is output toward the system.

In this case, the inverter controller operates based on the end of the series connection between the switching elements S3, S4 at the direct-current power source E side. Because the system voltage varies, the output of the inverter controller also varies, and the voltage between bus lines changes. The end of the series connection between the switching elements S3, S4 is a virtual intermediate point of the direct-current power source E. Therefore, based on the grounded phase Ug of the system power source U, the virtual intermediate point of the direct-current power source E varies by only the inverter output. This means that the ground voltage of the direct-current power source E varies in the cycle of the system.

In this case, when the direct-current power source E has a large grounded capacitance (stray capacitance) such as the capacitance of a solar cell, the following problems arise. First, when the direct-current power source E has a grounded capacitance, an alternate current (leak current) that is charged to and discharged from the electrostatic capacitance flows in the route of the backflow diode D to the stray capacitance of the solar cell to the earth, connected to each switching element of the system to the inverter controller.

Usually, a leak detector and a leak breaker are installed between the low-pass filters "L1, C2" and "L2, C2". When a detected leak current exceeds a predetermined value, the leak breaker carries out a break operation to separate the corresponding power converting apparatus for connection from the system. Therefore, when the direct-current power source E is a solar cell, the leak breaker operates due to a large grounded capacitance. Because the solar cell itself is exposed to rain and snow, when the grounded capacitance increases along the increase of wet positions, a leak current increases accordingly. As a result, the above break operation of the leak breaker occurs easily.

When the ground construction is insufficient, a high voltage is accumulated in the stray capacitance. Therefore, there is a risk that this stray capacitance harms a person when this person touches the stray capacitance.

FIG. 12 is a block diagram of a configuration example (part two) of a conventional power converting apparatus for system connection. FIG. 13 is a relevant waveform diagram for explaining the operation of the power converting apparatus for system connection shown in FIG. 12. FIG. 12 is an example of a configuration of a connection inverter using a half bridge. In other words, in FIG. 12, series-connected two capacitors C3, C4 are connected between a high-voltage bus line P and a low-voltage bus line N. Series-connected two switching elements "S1, S2" are also connected between the high-voltage bus line P and the low-voltage bus line N. The two capacitors C3, C4 have equal capacitances.

One end of a reactor L3 is connected to an end of the series connection (inverter output end) between the switching elements S1, S2. The other end of the reactor L3 is connected to one end of a capacitor C5 and the non-grounded phase Ua of the system power source U. The other end of the capacitor C5 and the grounded phase Ug of the system power source U are connected to the end of the series connection between the two capacitors C3, C4. The reactor L3 and the capacitor C5 constitute a low-pass filter.

The switching elements S1, S2 of the inverter controller alternately carry out an on/off operation based on a predetermined PWM signal in synchronism with a positive half cycle and a negative half cycle of the non-grounded phase system voltage Ua, thereby switching a voltage between bus lines. Low-pass filters "L3, C5" remove a high-frequency component. As a result, an alternate current voltage as a smooth sinusoidal wave similar to the non-grounded phase system voltage Ua is generated, and is output toward the system.

In this case, the inverter controller operates based on one end of the series connection between the switching elements S1, S2. Because the series-connected capacitors C1, C2 equally bear the voltage of the direct-current power source E, a potential of the end of the series connection between the capacitors C1, C2 is an intermediate voltage of the direct-current power source E. Therefore, in the configuration that has the end of the series connection between the capacitors C1, C2 connected to the grounded phase Ug of the system power source U, the inter-bus line voltage is stable even when the voltage of the system varies. The inverter output end outputs a voltage equivalent to the non-grounded phase system voltage Ua.

As a result, the ground voltage of the direct-current power source E becomes a direct current voltage. Therefore, even when the grounded capacitance is present in the direct-current power source E, the above leak current is prevented from flowing, and there is no risk that the leak breaker carries out the break operation. However, in the connection inverter of a half bridge, positive and negative wave crest values of the system voltage need to be output. Therefore, the voltage of the direct-current power source E needs to be a substantially larger value than the positive and negative wave crest values of the system voltage. For example, when the system power source is AC 230V, the voltage of the direct-current power source E needs to be equal to or larger than "2√2" times of AC 230V, that is, DC 630V. In other words, the voltage of the direct-current power source E of the connection inverter of a half bridge needs to be two times of the direct-current power source E of the full bridge connection inverter shown in FIG. 10. A withstand voltage of a used switching element also needs to be two times. In general, a switching element having a high withstand voltage has larger power loss. Therefore, the power conversion efficiency of the connection inverter of a half bridge decreases significantly.

FIG. 14 is a block diagram of a configuration example (part three) of a conventional power converting apparatus for system connection. FIG. 15 is a relevant waveform diagram for explaining the operation of the power converting apparatus for system connection shown in FIG. 14. In FIG. 14, a transformer T is provided in place of the reactors L1, L2 in the configuration shown in FIG. 10.

In this configuration, the operation of the inverter controller is similar to that of the inverter controller shown in FIG. 10. The transformer T insulates between the inverter controller and the system power source U. Therefore, even when a voltage of the system varies, a voltage between bus lines does not change, and the above leak current is prevented from flowing. However, because a power loss occurs due to the transformer T, the power conversion efficiency decreases significantly. Because the transformer T has a large mass and is heavy in general, it is difficult to decrease the size and weight of the apparatus.

As described above, according to the connection inverter of a half bridge, two series-connected capacitors equally bear the voltage of a direct-current power source, and give an intermediate voltage of the direct-current power source. Therefore, when a grounding wire of the system is connected to the end of the series connection, a leak current can be avoided even when the direct-current power source has a large grounded capacitance like that of a solar cell.

A three-level inverter is known as an inverter that uses two series-connected capacitors that equally bear the voltage of the direct-current power source. The three-level inverter is an inverter that switches between three voltage levels of a high voltage, a low voltage, and an intermediate voltage. The three-level inverter has a complex circuit configuration as compared with a two-level inverter that alternately output-controls a high voltage and 0V. However, the three-level inverter has advantages: (1) because the inverter can decrease a higher harmonic component, the inverter has little noise; (2) the inverter can minimize pulsation of a motor torque during a driving of a three-phase motor; (3) the three-phase motor has small magnetic distortion noise; and (4) the inverter can set a low withstand voltage of a switching element, and therefore, this three-level inverter is widely used. Patent Document 1, for example, discloses a technique of pulse-width modulating two carrier signals by switching the carrier signals, in a simple processing, depending on whether the voltage command value is larger than a predetermined voltage command value, to acquire an output voltage to meet the voltage command value of any amplitude, in driving a three-phase motor.

When a three-level inverter having the above excellent characteristics is used for system connection, a leak current can be avoided even when a direct-current power source having a large grounded capacitance like that of a solar cell is used. Further, because the three-level inverter has no transformer, the power conversion efficiency can be improved, and the size and weight of the system can be decreased.

Patent Document 1: Japanese Patent Application Laid-open No. H9-163755

DISCLOSURE OF INVENTION

Problem to be Solved by the Invention

However, according to the direct-current power generation system which is to be connected to a commercial power system in this invention, a power generation voltage varies depending on environmental conditions such as sunshine and temperature, like a solar cell. Therefore, a difference occurs between voltages applied to the two series-connected capacitors. Each terminal voltage of the two series-connected capacitors also changes due to a variation in the output power of the inverter attributable to a variation in the systems and devices as inverter load. Further, a leak current is unavoidably present in the capacitors, and currents are not equal and are varied in the two capacitors. Therefore, a difference occurs between terminal voltages of the two series-connected capacitors.

Consequently, according to a three-level inverter based on the assumption that two series-connected capacitors equally bear the voltage of the direct-current power source, when there is a difference between voltages applied to the two series-connected capacitors, the balance between positive and negative voltages of alternate-current power to be output and the current balance are broken. Therefore, a countermeasure is necessary.

When the voltage of the direct-current power source as a direct-current power generation facility is lower than the voltage of the system, a booster circuit is provided. In providing a booster circuit, when one booster circuit is used to boost voltages at both ends of a series circuit of the two series-connected capacitors as a direct-current power source that is direct to the inverter, the booster circuit requires an element of high withstand voltage. Consequently, it becomes difficult to increase efficiency.

The present invention has been achieved in view of the above problems, and an object of the present invention is to provide a power converting apparatus for system connection that can execute a system connection of an adverse current to a commercial power system having one phase as a grounding wire, in high power conversion efficiency, by keeping stabilization of currents and voltage of alternate-current power to be output and keeping positive and negative balance, without passing a leak current even when a direct-current power generation facility has a large grounded capacitance.

It is another object of the present invention to provide a power converting apparatus for system connection that can repeat and stop operations without causing a trouble in the switching element.

Means for Solving Problem

To achieve the above object, a power converting apparatus for system connection according to one aspect of the present invention converts direct-current power generated by a direct-current power generation facility into alternate-current power, and supplies the alternate-current power to a commercial power system having one phase as a grounding wire out of two phases distributed to consumers. The power converting apparatus for system connection includes two capacitors that are connected in series between a positive electrode and a negative electrode of the direct-current power generation facility to equally bear a direct-current voltage output from the direct-current power generation facility, and that have the grounding wire connected to an end of the series connection between the two capacitors; an inverter unit in which, out of four switching elements connected in series between a positive electrode side and a negative electrode side of the series circuit of the two capacitors, an end of a connection between a series circuit of two switching elements at the positive electrode side and a series circuit of two switching elements at the negative electrode side constitutes an inverter output end, and an end of the series connection between the two switching elements and an end of the series connection between the two capacitors at the positive electrode side are connected to each other by a clamp diode, and an end of the series connection between the two switching elements and an end of the series connection between the two capacitors at the negative electrode side are connected to each other by a clamp diode; a smoothing circuit that connects an inverter output end of the inverter unit to a power supply wire from the commercial power system; a current detector that detects an alternate current flowing through one of the power supply wire and the grounding wire, or a system voltage detector that directly detects an alternate voltage at the grounding wire; and an operation controller that controls the generation of a PWM signal given to the four switching elements to minimize a difference between a current value detected by the current detector and a target current value, or minimize a difference between a voltage value detected by the system voltage detector and a target voltage value, in the process of on/off controlling the four switching elements in a predetermined order and outputting alternate-current power corresponding to a frequency and a voltage of the commercial power system from the inverter output end.

According to the present invention, because the four switching elements of the inverter do not need to use elements of high withstand voltage, high power conversion efficiency can be acquired. Because the end of the series connection between the two capacitors is connected to the grounding wire, and because the potential of the grounding wire is maintained at an intermediate voltage based on the operation of the two clamp diodes, a flow of a leak current does not occur even when the direct-current power generation facility has a large grounded capacitance like a solar cell. The output current and the output voltage to the system are monitored, and a PWM control is carried out so that a variation is accommodated within a constant range of values. Therefore, even when voltages at both ends of the series capacitor as a direct direct-current power source change, the output current and output voltage to the system can be stabilized.

Effect of the Invention

According to the present invention, a system connection of an adverse current can be executed to a commercial power system having one phase as a grounding wire, in high power-conversion efficiency, by stabilizing a current and a voltage of output alternate-current power, without passing a leak current, even when a direct-current power generation facility has a large ground capacitance.

BRIEF DESCRIPTION OF THE DRAWINGS

FIG. 15 is a relevant waveform diagram for explaining an operation of the power converting apparatus for system connection shown in FIG. 14.

EXPLANATIONS OF LETTERS OR NUMERALS 10a, 10b, 10c, 10d, 10e, 10f Power converting apparatus (Power converting apparatus for system connection)
12 Smoothing circuit (Low-pass filter)
14, 20, 28, 30, 36, 38 Operation control circuit
14a Adder
14b Proportional-integral compensator
14c Comparator
14d Sinusoidal wave generator
16 Current detector (CT)
22, 24, 26 Voltage detector
32, 34 Booster circuit
S1 to S6 Switching element
C1 to C5 Capacitor
D Backflow diode
D1, D2 Diode for clamp
D3, D4 Diode for preventing adverse flow
L1, L2, L3 Reactor
E Direct-current power source (Direct-current power generation facility)
U System power source (Commercial power system)
Y Intermediate point
R Resistor

BEST MODE(S) FOR CARRYING OUT THE INVENTION

Exemplary embodiments of a power converting apparatus for system connection according to the present invention will be explained below in detail below with reference to the accompanying drawings.

First Embodiment

Figure 1:
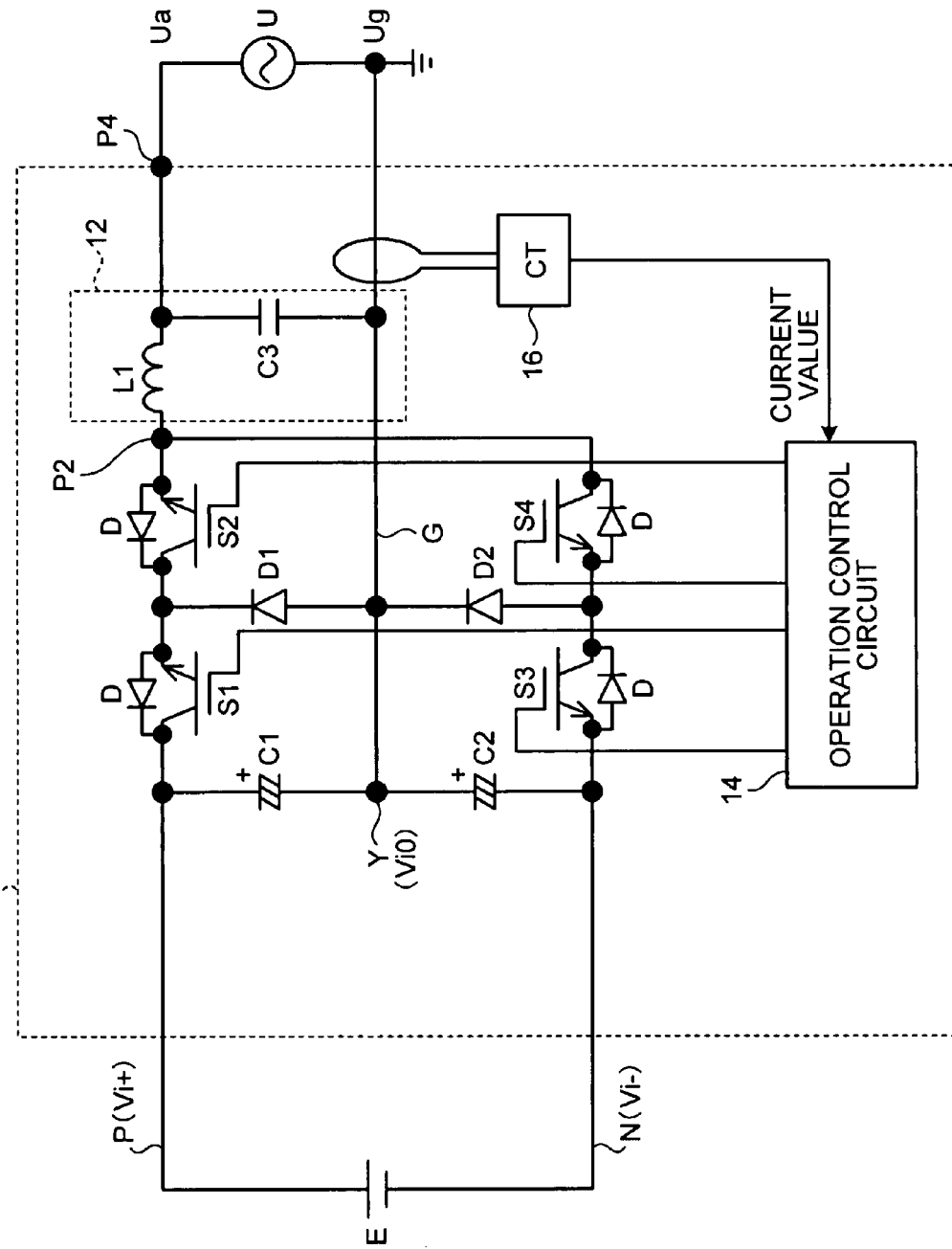
FIG. 1 is a block diagram of a configuration of a power converting apparatus for system connection according to a first embodiment of the present invention.

FIG. 1 is a block diagram of a configuration of a power converting apparatus for system connection according to a first embodiment of the present invention. The power converting apparatus for system connection is hereinafter simply abbreviated as a "power converting apparatus".

In FIG. 1, the direct-current power source E is a power generation facility that has a possibility of generating a variation in direct-current power generated. The direct-current power source E includes a fuel cell in addition to a solar cell that receives the influence of sunshine, temperature, and humidity. The direct-current power source E also includes a power generation facility that can output direct-current power by applying a converter to an alternate-current power generator such as wind power generator and a geothermal power generator.

The system power source U is a commercial power system having a single-phase grounding. This commercial power system employs a system in which the grounded phase Ug is grounded at the system power source U side, and a grounding wire to be connected to the grounded phase Ug is wired to a consumer, together with a power supply wire that is connected to the non-grounded phase Ua. A commercial power system having this kind of a single-phase grounding includes the following known systems: (1) a system that employs a power distribution system according to single-phase two lines of the single-phase grounding; (2) a system that employs a power distribution system according to a neutral line of neutral ground single-phase three lines; (3) a system that employs a power distribution system according to a grounding wire of a Δ wire connection one-phase ground three-phase grounding wire and one wire; and (4) a system that employs a power distribution system according to a Y-wire connection neutral ground three-phase neutral line and each phase.

In the first embodiment, a voltage of the direct-current power source E higher than a voltage (wave crest value) of the system power source U is handled. A power converting apparatus 10a disposed between the direct-current power source E and the system power source U includes: two capacitors C1, C2; four switching elements S1, S2, S3, S4 and two diodes D1, D2 that constitute a three-level inverter; a smoothing circuit 12; an operation control circuit 14; and a CT (current detector) 16. The four switching elements S1 to S4 are IGBTs, for example, and each backflow diode D is connected inversely parallel to each switching element.

The two capacitors C1, C2 are connected in series between a high-voltage bus line P that is connected to a positive electrode (voltage Vi+) of the direct-current power source E and a low-voltage bus line N connected to a negative electrode (voltage Vi−). Voltages at both ends of the series circuit of the two capacitors C1, C2 are direct-current power sources direct to the three-level inverter. Because both voltages have substantially equal capacitances, a series-connection end Y is a neutral point (reference point) that gives an intermediate potential (Vi0) of the output voltage of the direct-current power source E. In the present embodiment, the series-connection end Y of the series connection between the two capacitors C1, C2 is connected to the grounded phase Ug of the system power source U through a grounding wire G.

The four switching elements S1 to S4 are connected in series between the high-voltage bus line P and the low-voltage bus line N, that is, between both ends of the series circuit of the two capacitors C1, C2. Out of the four switching elements S1 to S4, the two switching elements S1, S2 that are connected in series between the high-voltage bus line P and the inverter output end P2 function as a positive electrode arm. The two switching elements S3, S4 that are connected in series between the low-voltage bus line N and the inverter output end P2 function as a negative electrode arm.

The diode D1 for an intermediate-point clamp is provided in the polarity to connect its anode to the series-connection end Y, between the intermediate point of the positive electrode arm (that is, the end of the series connection between the switching elements S1, S2) and the series-connection end Y of the series connection between the two capacitors C1, C2. Further, the diode D2 for an intermediate-point clamp is provided in the polarity to connect its cathode to the series-connection end Y, between the intermediate point of the negative electrode arm (that is, the end of the series connection between the switching elements S3, S4) and the series-connection end Y of the series connection between the two capacitors C1, C2.

The smoothing circuit 12 is a low-pass filter that includes the reactor L1 and the capacitor C3. One end of the reactor L1 is connected to the inverter output end P2, and the other end of the reactor L1 is connected to the non-grounded phase Ua of the system power source U. One end of the capacitor C3 is connected to a line that connects between the other end of the reactor L1 and the non-grounded phase Ua of the system power source U, and the other end of the capacitor C3 is connected to the grounding wire G. Based on this configuration, the smoothing circuit 12 removes the higher harmonic of the alternate current voltage of the analog PWM signal waveform, of which amplitude output to the inverter output end P2 changes in a sinusoidal wave, thereby smoothing and transforming the alternate current voltage into a system voltage of a smooth sinusoidal waveform. The smoothing circuit 12 outputs this system voltage to the non-grounded phase Ua of the system power source U.

A CT 16 is disposed to detect an alternate current that flows through the grounding wire G, in FIG. 1. The operation control circuit 14 applies a PWM signal and a binary level signal corresponding to each gate electrode of the four switching elements S1 to S4, thereby on/off controlling the switching elements (see FIG. 3), and controls to generate a PWM signal to be applied to each gate electrode of the four switching elements S1 to S4 to make small a difference between the current value detected by the CT 16 and a target current value, in the process of outputting alternate-current power corresponding to the frequency and voltage of the system power source U from the inverter output end P2 synchronously with a positive half cycle and a negative half cycle of the system (see FIG. 2). A known method of synchronizing with the system can be used, and the explanation of this method is omitted.

Figure 2:
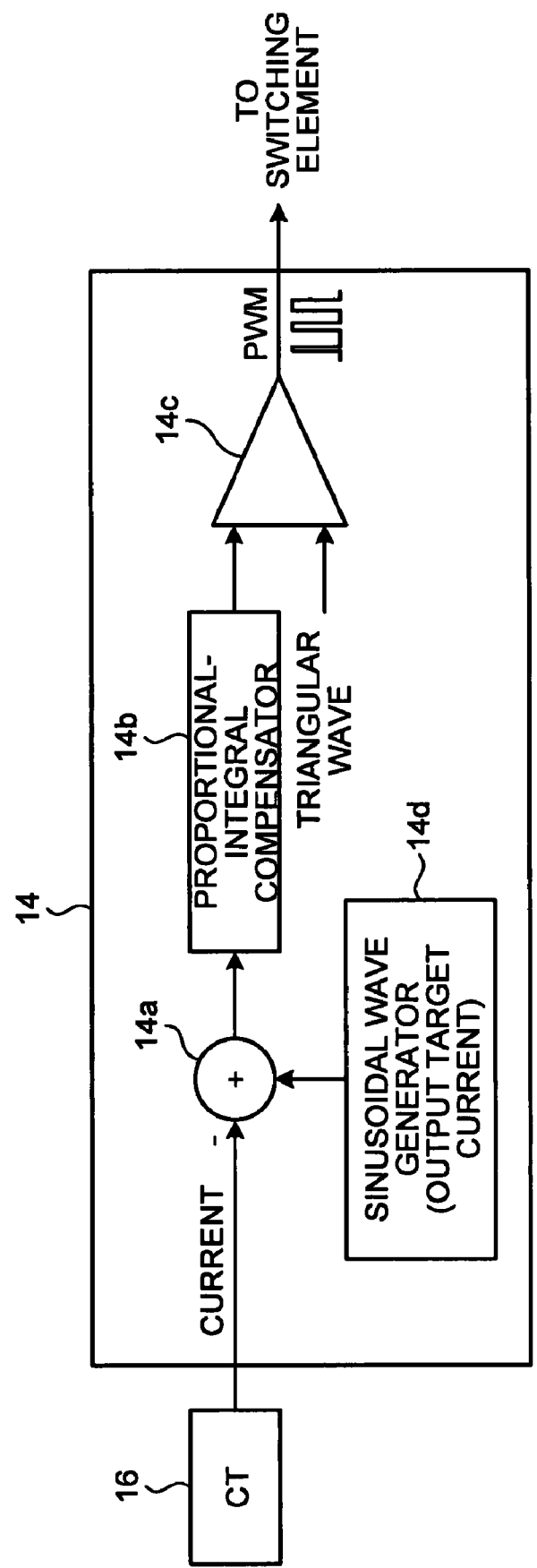
FIG. 2 is a block diagram of a configuration example of an operation control circuit shown in FIG. 1.
Figure 3:
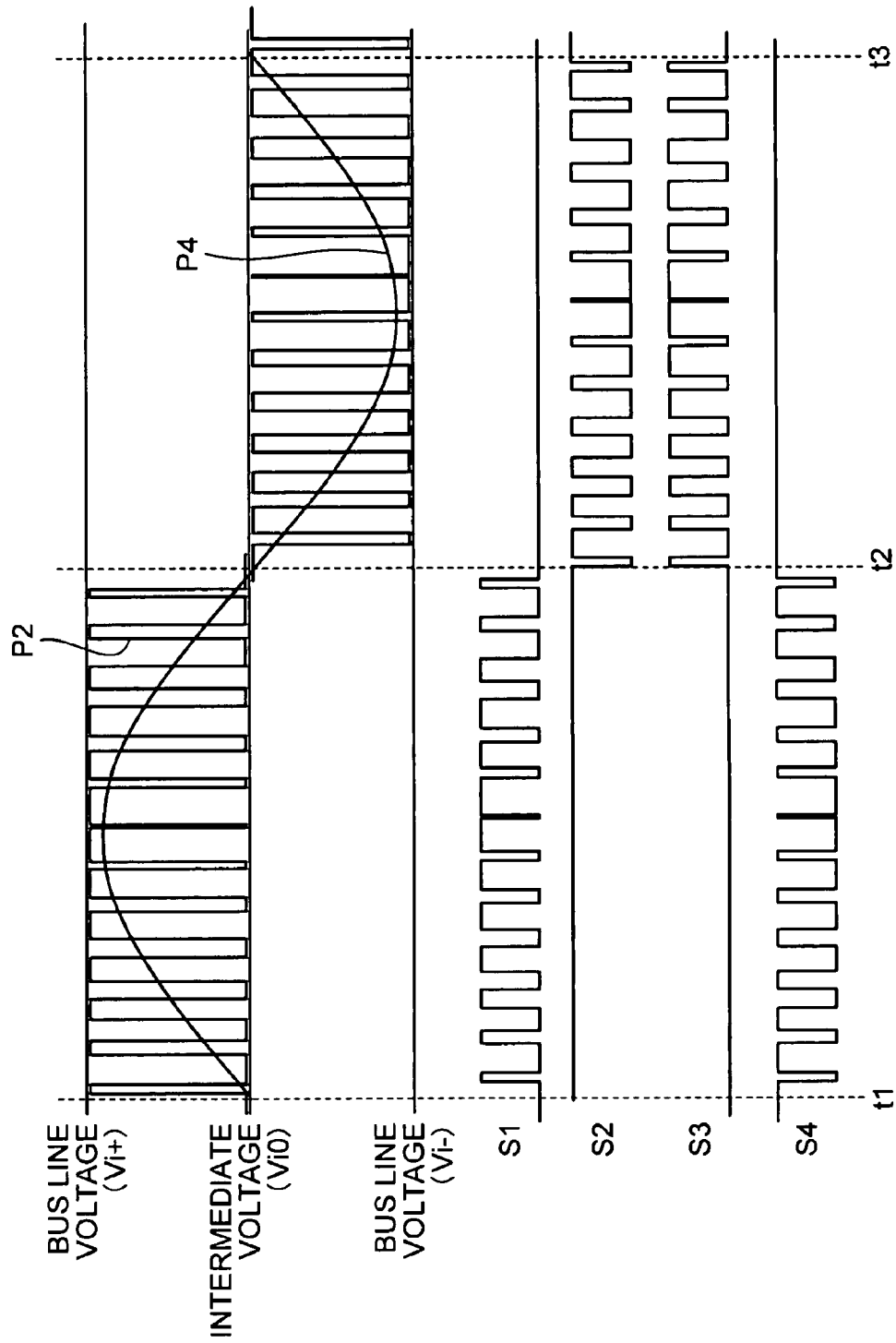
FIG. 3 is a relevant waveform diagram for explaining an operation of the power converting apparatus for system connection shown in FIG. 1.
Figure 11:
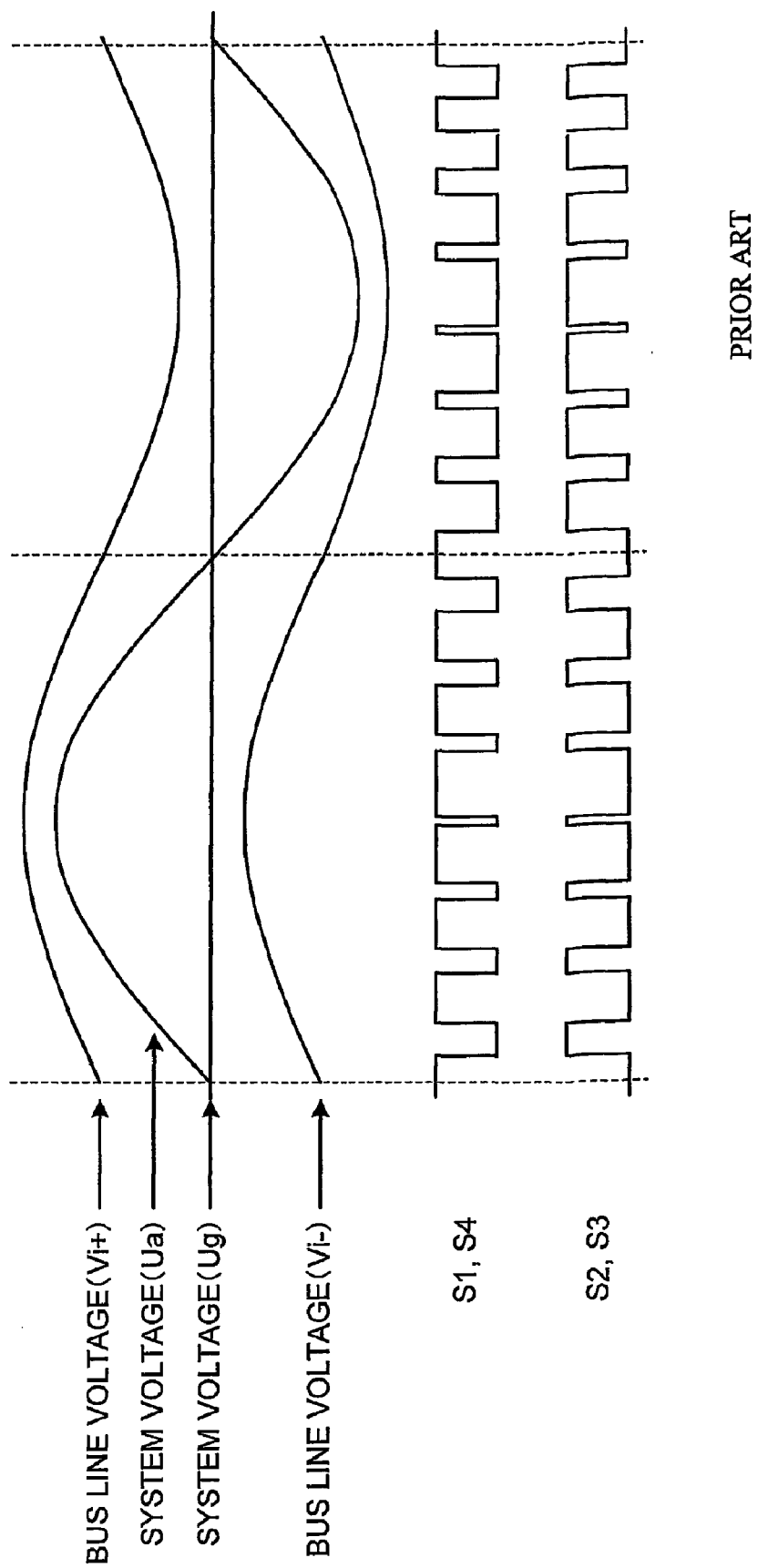
FIG. 11 is a relevant waveform diagram for explaining an operation of the power converting apparatus for system connection shown in FIG. 10.
Figure 12:
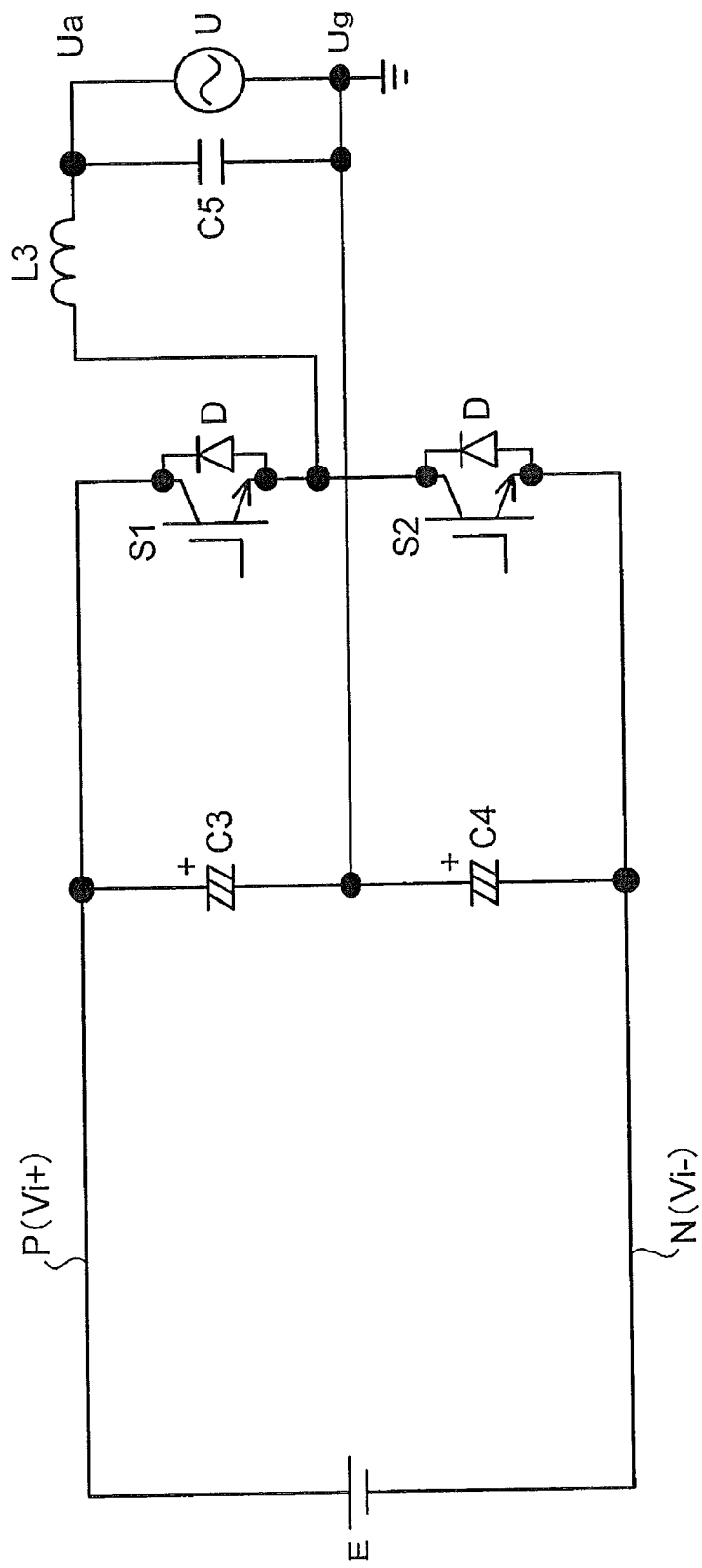
FIG. 12 is a block diagram of a configuration example (part two) of a conventional power converting apparatus for system connection.
Figure 13:
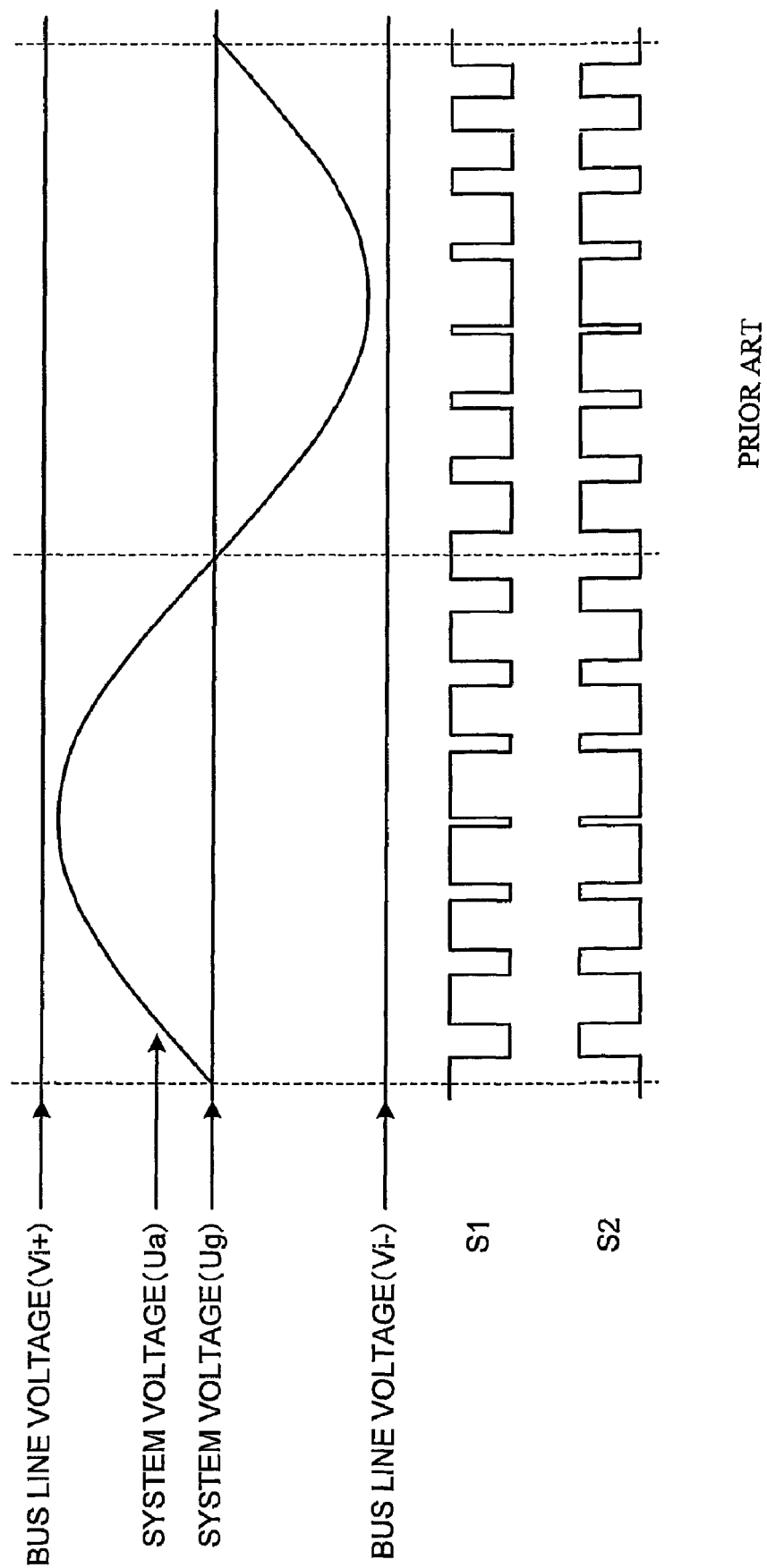
FIG. 13 is a relevant waveform diagram for explaining the operation of the power converting apparatus for system connection shown in FIG. 12.
Figure 14:
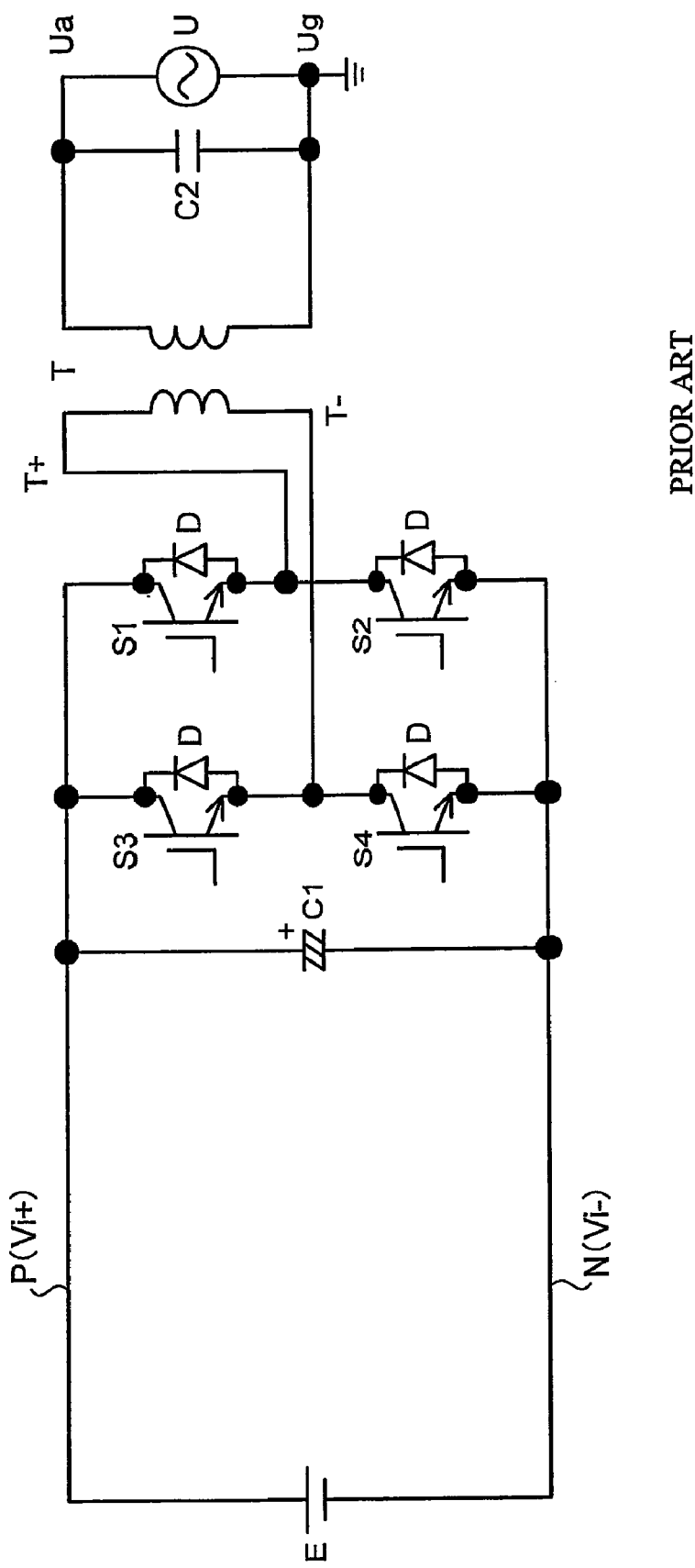
FIG. 14 is a block diagram of a configuration example (part three) of a conventional power converting apparatus for system connection.

The operation of the power converting apparatus 10a shown in FIG. 11 is explained with reference to FIG. 1 to FIG. 3. FIG. 2 is a block diagram of a configuration example of the operation control circuit shown in FIG. 1. FIG. 3 is a relevant waveform diagram for explaining the operation of the power converting apparatus shown in FIG. 1.

The operation control circuit 14 shown in FIG. 1 includes an adder 14a, a proportional-integral compensator 14b, a comparator 14c, and a sinusoidal wave generator 14d, as a configuration that controls generation of a PWM signal to be applied to each gate electrode of the four switching elements S1 to S4 to make small a difference between the current value detected by the CT 16 and a target current value, as shown in FIG. 2, for example.

In FIG. 2, the adder 14a subtracts an output current of the power converting apparatus 10a detected by the CT 16 from the output target current (for example, one ampere) of a sinusoidal wave output from the sinusoidal wave generator 14d, and outputs the subtracted result. The sinusoidal wave generator 14d can variably set the output target current value. The proportional-integral compensator 14b proportionally integrates and compensates for a current difference calculated by the adder 14a, and outputs the compensated result. The comparator 14c compares the current difference (sinusoidal wave) compensated for by the proportional-integral compensator 18b with a triangular wave signal from a carrier generator not shown. The comparator 14c outputs a PWM signal obtained by changing over between a high level of a predetermined pulse width and a low level of a predetermined pulse width at a point where a sinusoidal wave and a triangular wave cross each other, to a corresponding gate electrode of the four switching elements S1 to S4.

In this case, at the time of outputting this PWM signal, when the output current is larger than the output target current, the comparator 14c decreases the pulse width, and when the output current is smaller than the output target current, the comparator 14c increases the pulse width.

FIG. 3 depicts, at an upper part, a relationship between a bus line voltage (Vi+) at a positive electrode side, a bus line voltage (Vi−) at a negative electrode side, an intermediate voltage (Vi0), an output waveform (output analog PWM signal waveform of the three-level inverter) at the inverter output end P2, and an output waveform (smooth sinusoidal wave voltage waveform to the system) at the output end P4 of the smoothing circuit 12. FIG. 3 depicts, at a lower part, a waveform of a PWM signal applied to the four switching elements S1 to S4, and a binary level signal.

A period from time t1 to time t2 is a positive half cycle of a system voltage, and a period from time t2 to time t3 is a negative half cycle of the system voltage. The operation control circuit 14 applies a PWM signal and a binary level signal to each gate electrode of the four switching elements S1 to S4, synchronously with the positive half cycle and the negative half cycle of the system voltage, thereby executing on/off driving the switching elements.

In other words, as shown in FIG. 3, during the positive half cycle of the system voltage, in the switching elements S1, S2 of the positive electrode arm, the switching element S2 is controlled in the on-operation state by the high-level level signal, and the switching element S1 executes an on/off operation by receiving a predetermined PWM signal. In this case, in the switching elements S3, S4 of the negative electrode arm, the switching elements S3 is controlled in the off-operation state by the low-level level signal, and the switching element S4 executes an on/off operation by receiving a PWM signal in the phase opposite to the phase of the switching element S1.

During the negative half cycle of the system voltage, in the switching elements S3, S4 of the negative electrode arm, the switching elements S4 is controlled in the on-operation state by the high-level level signal, and the switching element S3 executes an on/off operation by receiving a predetermined PWM signal. In this case, in the switching elements S1, S2 of the positive electrode arm, the switching elements S1 is controlled in the off-operation state by the low-level level signal, and the switching element S2 executes an on/off operation by receiving a PWM signal in the phase opposite to the phase of the switching element S3.

Based on the above operations, the inverter output end P2 outputs an alternate current voltage of an analog PWM signal waveform of which amplitude changes in a sinusoidal waveform. The output end P4 of the smoothing circuit 12 outputs a smooth sinusoidal waveform voltage of the system. In the above operation process, the comparator 14c shown in FIG. 2 executes in each of the positive and negative cycles "the above operation of decreasing the pulse width of the PWM signal when the output current is larger than the output target current, and an operation of increasing the pulse width of the PWM signal when the output current is smaller than the output target current". With this arrangement, the output current of the power converting apparatus 10a can be set closer to the output target current, and the output current to the system can be stabilized.

Because the diodes D1, D2 are present, in the above operation process, in the timing that both the switching element 1 and the switching element 3 carry out the off operation and both the switching element 2 and switching element 4 carry out the on-operation, when the current that flows through the inverter output end P2 faces the system power source U, a current path is formed from the grounding wire G to the inverter output end P2 via the diode D1 and the switching element S2. On the other hand, when the current that flows through the inverter output end P2 faces the direct-current power source E, a current path is formed from the inverter output end P2 to the grounding wire G via the switching element S4 and the diode D2.

When the diodes D1, D2 form these current paths, the intermediate voltage (Vi0) at the series-connection end Y of the series connection between the capacitors C1, C2 that is connected to the end of the series connection between the diodes D1, D2 is maintained. Therefore, the potential of the grounding wire G that connects between the series-connection end Y and the grounded phase Ug of the system power source U is maintained at the intermediate voltage (Vi0). In this way, the diodes D1, D2 work to clamp the intermediate voltage (Vi0).

As a result, because the voltage (Vi0) of the grounding wire G becomes a lower limit due to the diode D1, a voltage applied to between the collector electrode and the emitter electrode of the switching element S1 becomes the voltage that makes the terminal voltage of the capacitor C1, as a half voltage of the direct-current power source E, a maximum value. Because the voltage (Vi0) of the grounding wire G becomes a lower limit due to the diode D2, a voltage applied to between the collector electrode and the emitter electrode of the switching element S3 becomes the voltage that makes the terminal voltage of the capacitor C2, as a half voltage of the direct-current power source E, a maximum value. Similarly, a voltage that is applied to between the collector electrode and the emitter electrode of the switching element S2 becomes a voltage that makes the terminal voltage of the capacitor C2 a maximum value. A voltage that is applied to between the collector electrode and the emitter electrode of the switching element S4 becomes a voltage that makes the terminal voltage of the capacitor C1 a maximum value.

In short, in the series circuit of the capacitors C1, C2, because the terminal voltage of each capacitor is half of the voltage of the direct-current power source E, the withstand voltage of the four switching elements S1 to S4 does not need to correspond to the high voltage output from the direct-current power source E, and only needs to correspond to a half voltage of the direct-current power source E. Therefore, not only cost can be decreased but also power conversion efficiency can be improved.

Because the potential of the grounding wire G that connects between the end of the series connection between the capacitors C1, C2 and the grounded phase Ug of the system power source U is maintained at the intermediate voltage (Vi0), the ground voltage of the direct-current power source E becomes a direct current voltage having no variation. Therefore, when a solar cell having a large ground capacitance between the direct current E and the earth is use, a leak current is prevented from flowing via the ground capacitance.

As explained above, according to the first embodiment, when the direct current is higher than the system voltage (wave crest value), the four switching elements that execute inverter control do not need to be configured by a high-withstand voltage element. Therefore, a system connection of an adverse current flow can be carried out in high power conversion efficiency. When the end of the series connection between the series capacitors as a direct direct-current power source is connected to the grounding wire of the system, the potential of the grounding wire is clamped at a constant value. Therefore, even when a large stray capacitance is present between the direct-current power generation facility and the ground, a leak current is prevented from flowing. In this case, a variation is controlled to be accommodated within a constant range of values by monitoring the output current to the system. Therefore, even when the voltages at both ends of the series capacitors as a direct direct-current power source change, the output current to the system can be stabilized.

Second Embodiment

Figure 4:
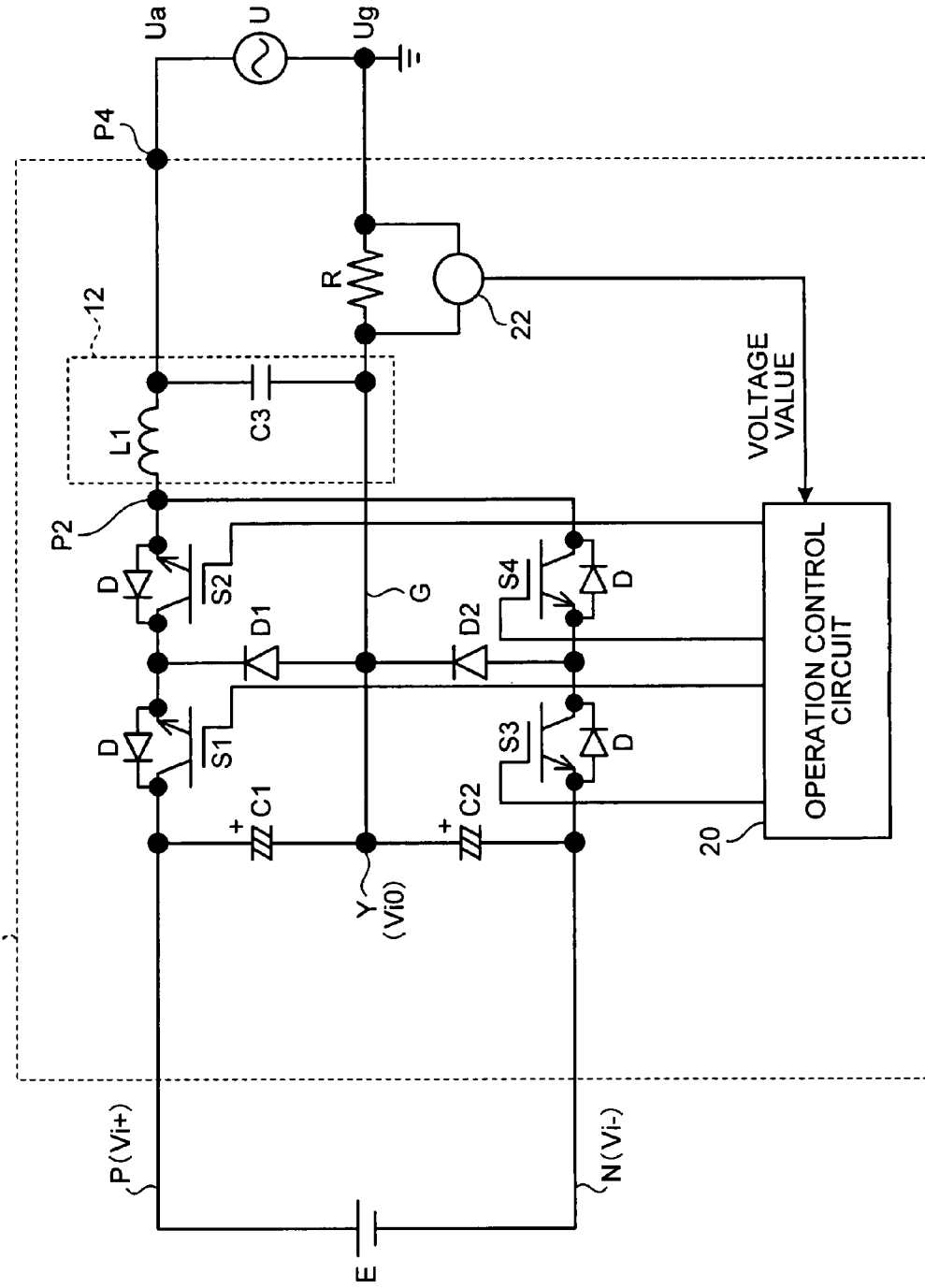
FIG. 4 is a block diagram of a configuration of a power converting apparatus for system connection according to a second embodiment of the present invention.

FIG. 4 is a block diagram of a configuration of a power converting apparatus for system connection according to a second embodiment of the present invention. In FIG. 4, constituent elements identical with or equivalent to those shown in FIG. 1 (the first embodiment) are denoted with like reference numerals. Parts that are relevant to the second embodiment are mainly explained below.

As shown in FIG. 4, a power converting apparatus 10b according to the second embodiment includes a resistor R that is present in the grounding wire G, and a voltage detector 22 that detects a drop voltage in the resistor R, in place of the CT 16 in the configuration shown in FIG. 1 (the first embodiment). A voltage detected by the voltage detector 22 is input to an operation control circuit 20 having a different reference numeral.

The operation control circuit 20 applies a PWM signal and a binary level signal corresponding to each gate electrode of the four switching elements S1 to S4, thereby on/off controlling the switching elements (see FIG. 3), and controls to generate a PWM signal to be applied to each gate electrode of the four switching elements S1 to S4 to make small a difference between the current value detected by the voltage detector 22 and a target current value, in the process of outputting alternate-current power corresponding to the frequency and voltage of the system power source U from the inverter output end P2 synchronously with a positive half cycle and a negative half cycle of the system.

A circuit that controls the generation of the PWM signal to be applied to each gate electrode of the four switching elements S1 to S4 to make small a difference between the current value detected by the voltage detector 22 and a target current value can be configured with the same concept as the configuration shown in FIG. 2. At the time of outputting a PWM signal, when the output voltage of the power converting apparatus 10b is larger than an output target voltage, the comparator 14c decreases the pulse width, and when the output voltage is smaller than the output target voltage, the comparator 14c increases the pulse width. With this arrangement, the output voltage of the power converting apparatus 10b can be set closer to the output target voltage, thereby stabilizing the output voltage to the system.

In this case, because the resistor R is present in the grounding wire G, the voltage detector 22 that is connected to the resistor R can detect a voltage of substantially the same level as the ground potential of the system, thereby decreasing the influence of noise. Because the ground voltage of the voltage detector 22 is stable, even when the resistor R is made small to decrease the drop voltage, the voltage detector 22 having small noise can be realized. Therefore, the output voltage of the power converting apparatus 10b can be stabilized in high precision.

As explained above, according to the second embodiment, the system connection of an adverse current flow can be achieved in high power-conversion efficiency. Even when a large stray capacitance is present between the direct-current power generation facility and the ground, a leak current can be prevent from flowing. Because the output voltage to the system is monitored, and a variation is controlled to be accommodated within a constant range of values, the output voltage to the system can be stabilized, even when voltages at both ends of the series capacitors as a direct direct-current source change. Because the output voltage to the system is monitored at the grounding wire side of the system, influence of noise can be avoided, and the output voltage can be stabilized in high precision.

Third Embodiment

Figure 5:
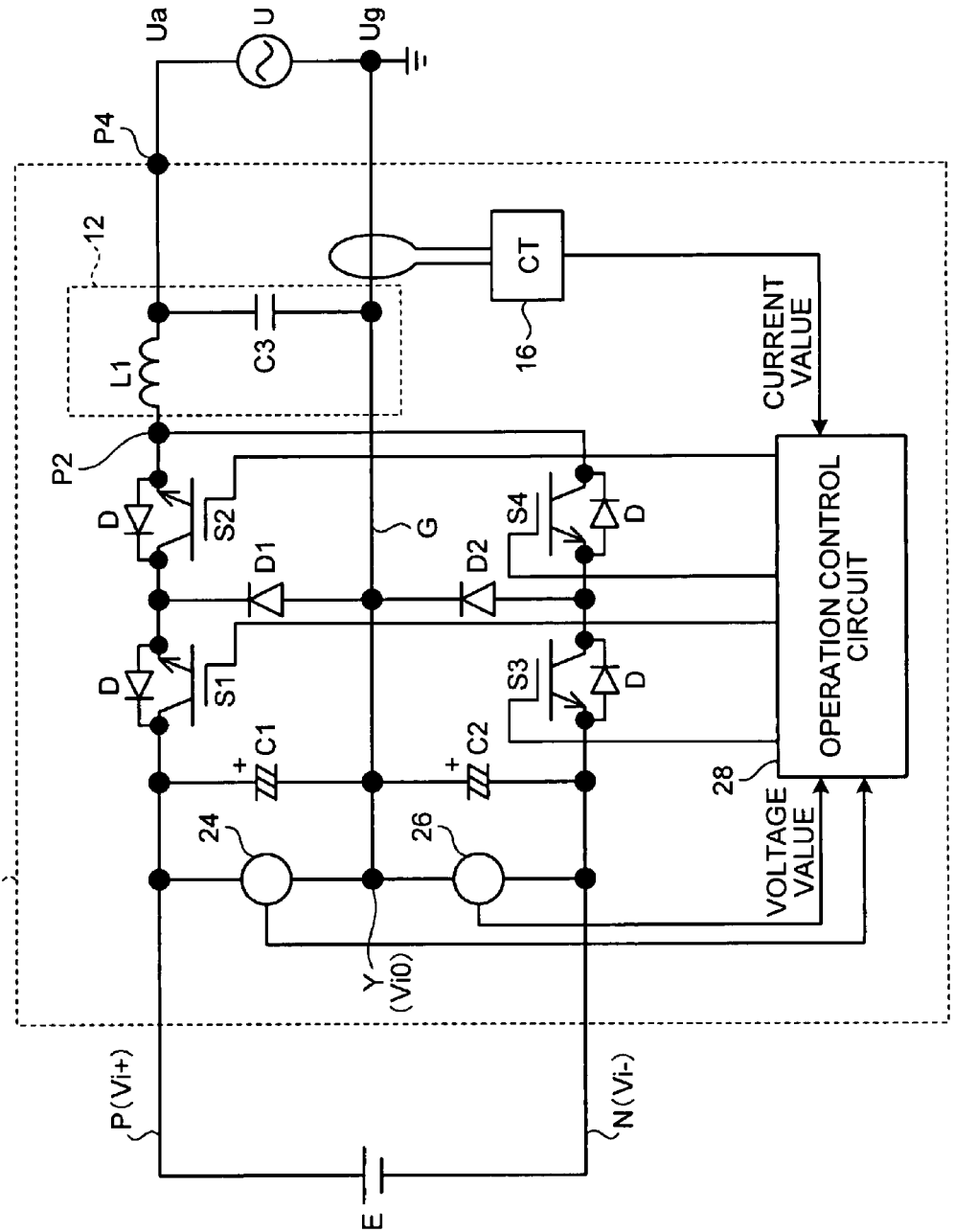
FIG. 5 is a block diagram of a configuration of a power converting apparatus for system connection according to a third embodiment of the present invention.

FIG. 5 is a block diagram of a configuration of a power converting apparatus for system connection according to a third embodiment of the present invention. In FIG. 5, constituent elements identical with or equivalent to those shown in FIG. 1 (the first embodiment) are denoted with like reference numerals. Parts that are relevant to the third embodiment are mainly explained below.

As shown in FIG. 5, a power converting apparatus 10c according to the third embodiment includes voltage detectors 24, 26 that detect terminal voltages of the capacitors C1, C2, in the configuration shown in FIG. 1 (the first embodiment). A voltage detected by each of the voltage detectors 24, 26 is input to an operation control circuit 28 having a different reference numeral.

The operation control circuit 28 controls the generation of a PWM signal to be applied to each gate electrode of the four switching elements S1 to S4 to make small a difference between the current value detected by the CT 16 and the target current value. In stabilizing the output current to the system, the operation control circuit 28 obtains a difference of voltages detected by the voltage detectors 24, 26, and executes in parallel the generation control of PWM signals applied to the gate electrodes of the four switching elements S1 to S4 so that the difference is accommodated within a constant range of values, thereby adjusting a balance of positive and negative loads of the output current.

Specifically, when the terminal voltage of the capacitor C1 is higher than the terminal voltage of the capacitor C2 (when the voltage detected by the voltage detector 24 is larger than the voltage detected by the voltage detector 26), the operation control circuit 28 adjusts a pulse width in each cycle so that the current output in the positive half cycle becomes slightly larger than the current output in the negative half cycle. With this arrangement, the operation control circuit 28 increases the discharge amount of the charge stored in the capacitor C1 to a level larger than the discharge amount of the charge stored in the capacitor C2. As a result, the terminal voltages of both capacitors are set close to each other.

On the other hand, when the terminal voltage of the capacitor C1 is lower than the terminal voltage of the capacitor C2 (when the voltage detected by the voltage detector 24 is smaller than the voltage detected by the voltage detector 26), the operation control circuit 28 adjusts a pulse width in each cycle so that the current output in the positive half cycle becomes slightly smaller than the current output in the negative half cycle. With this arrangement, the operation control circuit 28 decreases the discharge amount of the charge stored in the capacitor C1 to a level smaller than the discharge amount of the charge stored in the capacitor C2. As a result, the terminal voltages of both capacitors are set close to each other.

As explained above, according to the third embodiment, even when a difference occurs in the terminal voltages of the capacitors C1, C2 due to the variation in the output voltage of the direct-current power source E and the leak current of the capacitor itself, the terminal voltages of both capacitors can be controlled to become equal. Therefore, the positive and negative balance of the output current to the stabilization-controlled system in the first embodiment can be arranged.

Fourth Embodiment

Figure 6:
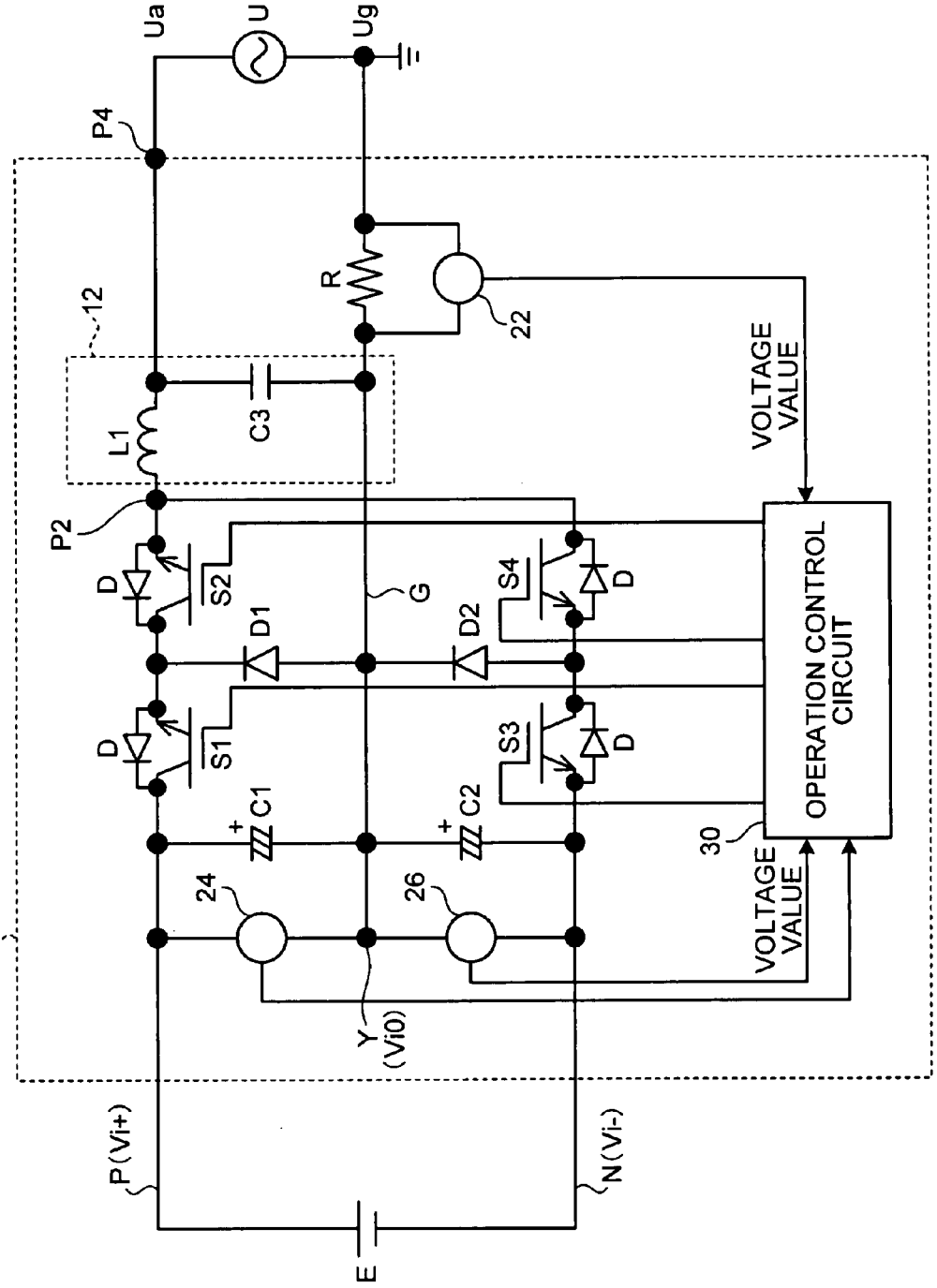
FIG. 6 is a block diagram of a configuration of a power converting apparatus for system connection according to a fourth embodiment of the present invention.

FIG. 6 is a block diagram of a configuration of a power converting apparatus for system connection according to a fourth embodiment of the present invention. In FIG. 6, constituent elements identical with or equivalent to those shown in FIG. 4 (the second embodiment) are denoted with like reference numerals. Parts that are relevant to the fourth embodiment are mainly explained below.

As shown in FIG. 6, a power converting apparatus 10d according to the fourth embodiment includes the voltage detectors 24, 26 that detect terminal voltages of the capacitors C1, C2, in the configuration shown in FIG. 4 (the second embodiment). A voltage detected by each of the voltage detectors 24, 26 is input to an operation control circuit 30 having a different reference numeral.

The operation control circuit 30 controls the generation of a PWM signal to be applied to each gate electrode of the four switching elements S1, S2, S3, S4, to make small a difference between the current value detected by the voltage detector 22 and the target current value. In stabilizing the output current to the system, the operation control circuit 30 obtains a difference of voltages detected by the voltage detectors 24, 26, and executes in parallel the generation control of PWM signals applied to the gate electrodes of the four switching elements S1, S2, S3, S4 so that the difference is accommodated within a constant range of values, thereby adjusting a balance of positive and negative loads of the output voltage.

Specifically, when the terminal voltage of the capacitor C1 is higher than the terminal voltage of the capacitor C2 (when the voltage detected by the voltage detector 24 is larger than the voltage detected by the voltage detector 26), the operation control circuit 30 adjusts a pulse width in each cycle so that the voltage output in the positive half cycle becomes slightly larger than the voltage output in the negative half cycle. With this arrangement, the operation control circuit 30 increases the discharge amount of the charge stored in the capacitor C1 to a level larger than the discharge amount of the charge stored in the capacitor C2. Accordingly, the terminal voltages of both capacitors are set close to each other.

On the other hand, when the terminal voltage of the capacitor C1 is lower than the terminal voltage of the capacitor C2 (when the voltage detected by the voltage detector 24 is smaller than the voltage detected by the voltage detector 26), the operation control circuit 30 adjusts a pulse width in each cycle so that the voltage output in the positive half cycle becomes slightly smaller than the voltage output in the negative half cycle. With this arrangement, the operation control circuit 30 decreases the discharge amount of the charge stored in the capacitor C1 to a level smaller than the discharge amount of the charge stored in the capacitor C2. As a result, the terminal voltages of both capacitors are set close to each other.

As explained above, according to the fourth embodiment, even when a difference occurs in the terminal voltages of the capacitors C1, C2 due to the variation in the output voltage of the direct-current power source E and the leak current of the capacitor itself, the terminal voltages of both capacitors can be controlled to become equal. Therefore, the positive and negative balance of the output voltage to the stabilization-controlled system in the second embodiment can be arranged.

Fifth Embodiment

Figure 7:
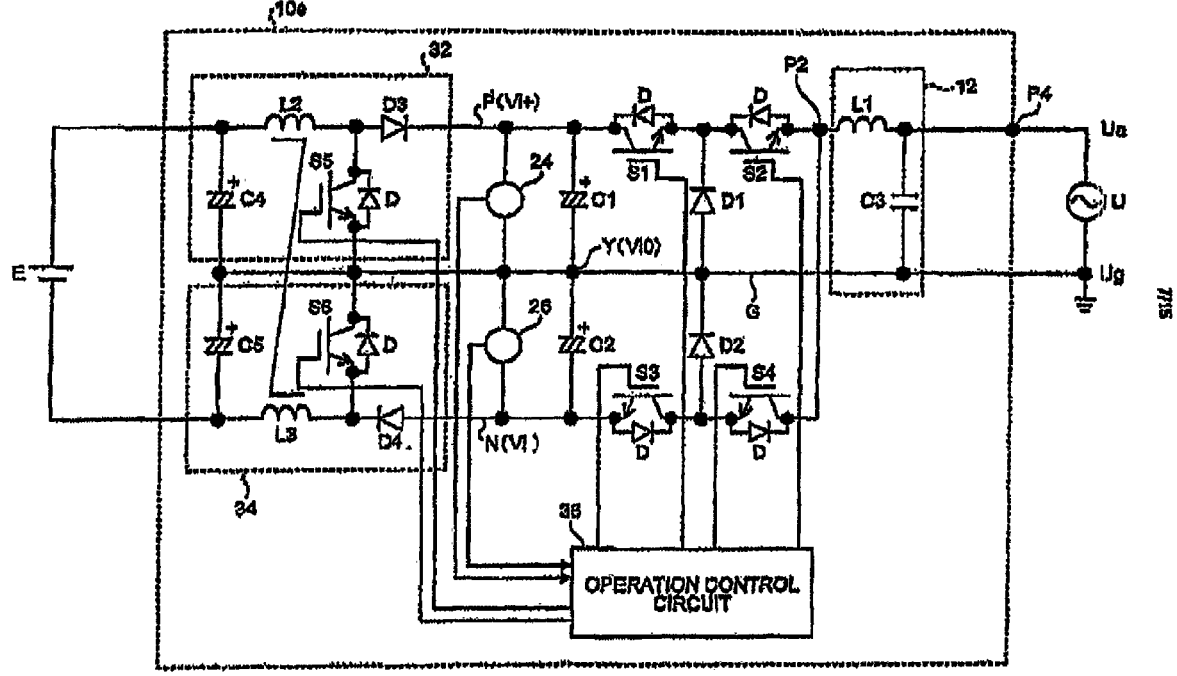
FIG. 7 is a block diagram of a configuration of a power converting apparatus for system connection according to a fifth embodiment of the present invention.

FIG. 7 is a block diagram of a configuration of a power converting apparatus for system connection according to a fifth embodiment of the present invention. In the fifth embodiment, a configuration example when the voltage of the direct-current power source E is lower than the voltage (wave crest value) of the system power source U is explained. In FIG. 7, constituent elements equivalent to or identical with the constituent elements explained in the above embodiments are denoted with like reference numerals.

A power converting apparatus 10e according to the fifth embodiment shown in FIG. 7 includes: two capacitors C1, C2; four switching elements S1, S2, S3, S4 and two diodes D1, D2 that constitute a three-level inverter; the smoothing circuit 12; an operation control circuit 36; two voltage detector 24, 26; and two booster circuits 32, 34. The four switching elements S1 to S4, and switching elements S5, S6 held by the booster circuits 32, 34 are IGBTs, for example, and the backflow diode D is inversely parallel connected to each switching element.

In other words, the power converting apparatus 10e shown in FIG. 7 excludes the CT 16 from the power converting apparatus 10c shown in FIG. 5, and has the two booster circuits 32, 34 disposed in a one-to-one relationship with the two capacitors C1, C2, between the direct-current power source E and the series circuit of the two capacitor C1, C2 as a direct direct-current power source of the three-level inverter. The operation control circuit 36 having a different reference numeral also controls the booster circuits 32, 34.

The booster circuit 32 includes the capacitor C4 and the reactor L2 of which one end respectively is connected to the positive electrode of the direct-current power source E, and the diode D of which collector electrode is connected to the other end of the reactor L2 and which is inversely parallel connected. The other end of the capacitor C4 and the emitter electrode of the switching element S5 are connected in common to the series-connection end Y of the series connection between the capacitors C1, C2. The end of the connection between the other end of the reactor L2 and the collector electrode of the switching element S5 is connected to the anode of a diode D3 that prevents an adverse flow. A high-voltage bus line P is connected to the cathode of the diode D3.

The booster circuit 34 includes the capacitor C5 and the reactor L3 of which one end respectively is connected to the positive electrode of the direct-current power source E, and the diode D of which emitter electrode is connected to the other end of the reactor L3 and which is inversely parallel connected. The other end of the capacitor C5 and the collector electrode of the switching element S6 are connected in common to the series-connection end Y of the series connection between the capacitors C1, C2. The end of the connection between the other end of the reactor L3 and the collector electrode of the switching element S6 is connected to the anode of a diode D4 that prevents an adverse flow. A low-voltage bus line N is connected to the anode of the diode D4.

Because the voltage of the direct-current power source E is lower than the voltage (wave crest value) of the system power source U, the operation control circuit 36 first controls the two booster circuits 32, 34 to boost the voltages at both ends of the series circuit of the two capacitors C1, C2 up to a voltage (Vi+, Vi−) necessary to generate an adverse flow of current. Thereafter, the operation control circuit 36 applies a PWM signal and a binary level signal corresponding to each gate electrode of the four switching elements S1 to S4 to on-off control the switching elements, thereby converting the direct-current power of the direct-current power source constituted by the series circuit of the two capacitors C1, C2 into alternate-current power, and outputs the alternate-current power to the system, as shown in FIG. 3, in a similar manner. In this operation process, the operation control circuit 36 controls the two booster circuits 32, 34 so that the voltages at both ends of the series circuit of the two capacitors C1, C2 maintain the voltage (Vi+, Vi−) that is necessary to generate an adverse flow of current.

The boosting operation of the two booster circuits 32, 34 is explained below. The series circuit of the two capacitors C4, C5 stabilizes the direct current voltage output by the direct-current power source E. Because the two capacitors C4, C5 have substantially equal capacitances, the series-connection end gives an intermediate potential of the output voltage of the direct-current power source E. When the switching elements S5, S6 are on-operated together, a current flows through the reactors L2, L3, and energy is stored. Thereafter, when the switching elements S5, S6 are off-operated together, the two capacitors C1, C2 are charged by the current that flows through the current path from the reactor L2 to the diode D, to the two capacitors C1, C2, the diode D4, and to the reactor L2, biased by the energy stored in the reactors L2, L3.

The operation control circuit 36 monitors the voltages detected by the two voltage detectors 24, 26, and repeats the above on-off control of the two switching elements S5, S6, thereby boosting the voltages at both ends of the series circuit of the two capacitors C1, C2 to the voltage (Vi+, Vi−) that is necessary to generate an adverse flow of current. Thereafter, the operation control circuit 36 similarly monitors the voltages detected by the two voltage detectors 24, 26, and controls the voltages to maintain the voltage (Vi+, Vi−) that is necessary to generate an adverse flow of current. A PWM signal is used to carry out the above on/off control of the two switching elements S5, S6, and the pulse width is adjusted to obtain the desired direct current voltage (Vi+, Vi−).

In the two booster circuits 32, 34, the withstand voltage of the switching element S5 can be a value corresponding to the terminal voltage of the capacitor C4, and the withstand voltage of the switching element S6 can be a value corresponding to the terminal voltage of the capacitor C5. In other words, like the four switching elements S1 to S4 that carry out the inverter control operation, a high withstand-voltage element does not need to be used for the switching elements S5, S6. Therefore, cost can be decreased, and boosting efficiency can be also improved.

In the two booster circuits 32, 34, the reactor L2 and the reactor L3 can be independent having no relation to each other. Alternately, both reactors can be magnetically connected to each other. In FIG. 7, the notation of a "Z" shape shown between the reactor L2 and the reactor L3 indicates that the reactor L2 and the reactor L3 are magnetically connected to each other. When the reactors L1, L2 are magnetically connected to each other as described above, the reactors can be integrally configured, and the booster circuits 32, 34 can be made compact.

As explained above, in the fifth embodiment, when the direct current voltage generated by the direct-current power generation facility is lower than the voltage necessary to generate an adverse flow of current, the booster circuit is provided. The booster circuit is not provided by one for the series circuit of two capacitors as a direct direct-current power source of the three-level inverter. Instead, the booster circuit is provided in one-to-one relationship with each capacitor. Therefore, boosting efficiency can be improved, without requiring each booster circuit to use a high withstand-voltage switching element.

Even when the direct current voltage generated by the direct-current power generation facility varies, voltages at both ends of the series circuit of the two capacitors as a direct direct-current power source can be maintained at a desired value. Therefore, power conversion of an adverse current flow can be executed stably. Particularly, when the direct-current power generation facility is a direct-current power source that uses natural energy such as a solar cell, a voltage variation is large and a stable direct current voltage cannot be obtained, in many cases. However, in this case, the output power to the system can be stabilized.

In addition, because the reactor that is used in the two booster circuits can be magnetically connected to each other, the two booster circuits can be made compact.

Sixth Embodiment

Figure 8:
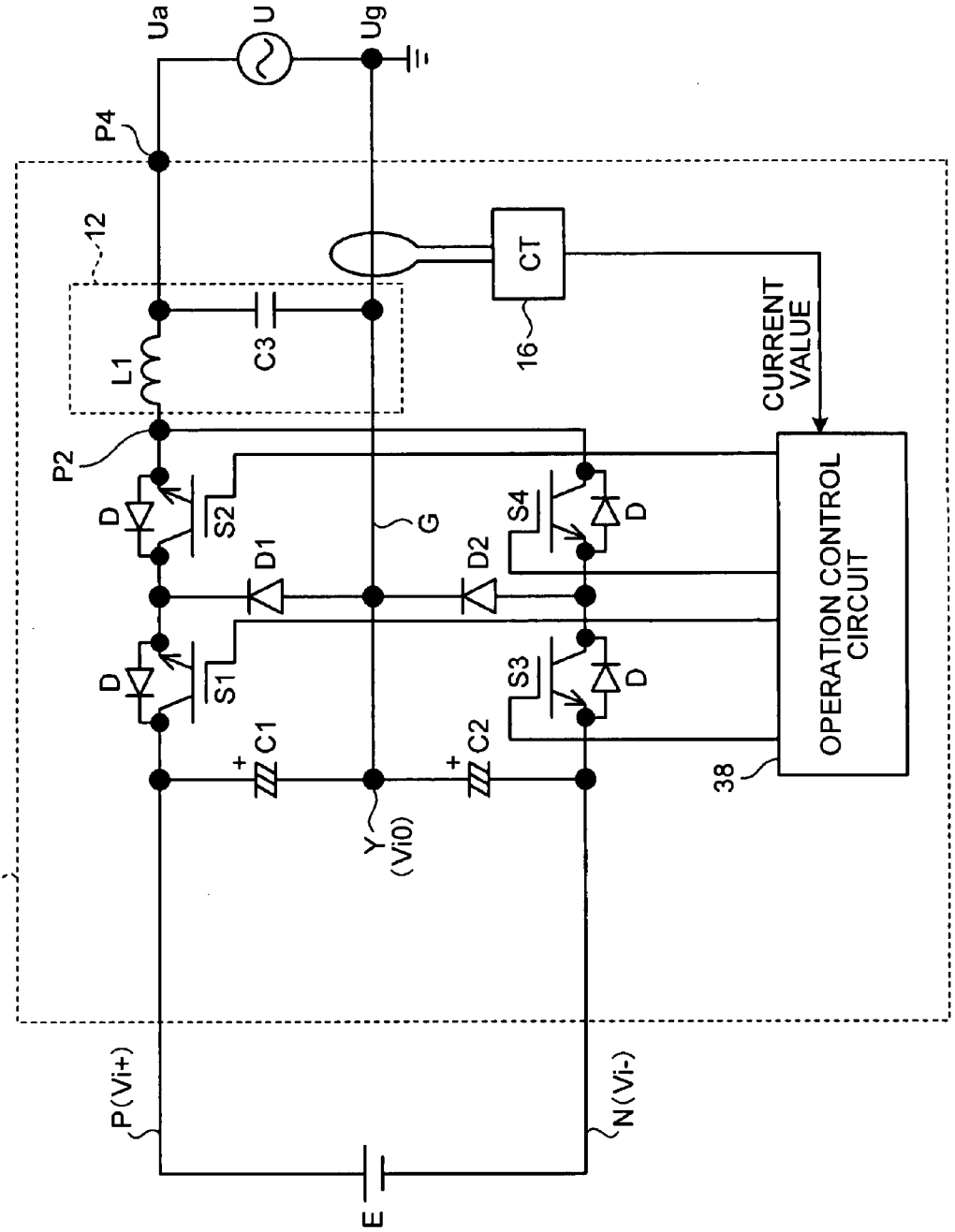
FIG. 8 is a block diagram of a configuration of a power converting apparatus for system connection according to a sixth embodiment of the present invention.

FIG. 8 is a block diagram of a configuration of a power converting apparatus for system connection according to a sixth embodiment of the present invention. In the sixth embodiment, a control method of stopping the operation of each power converting apparatus explained above is explained.

Figure 9:
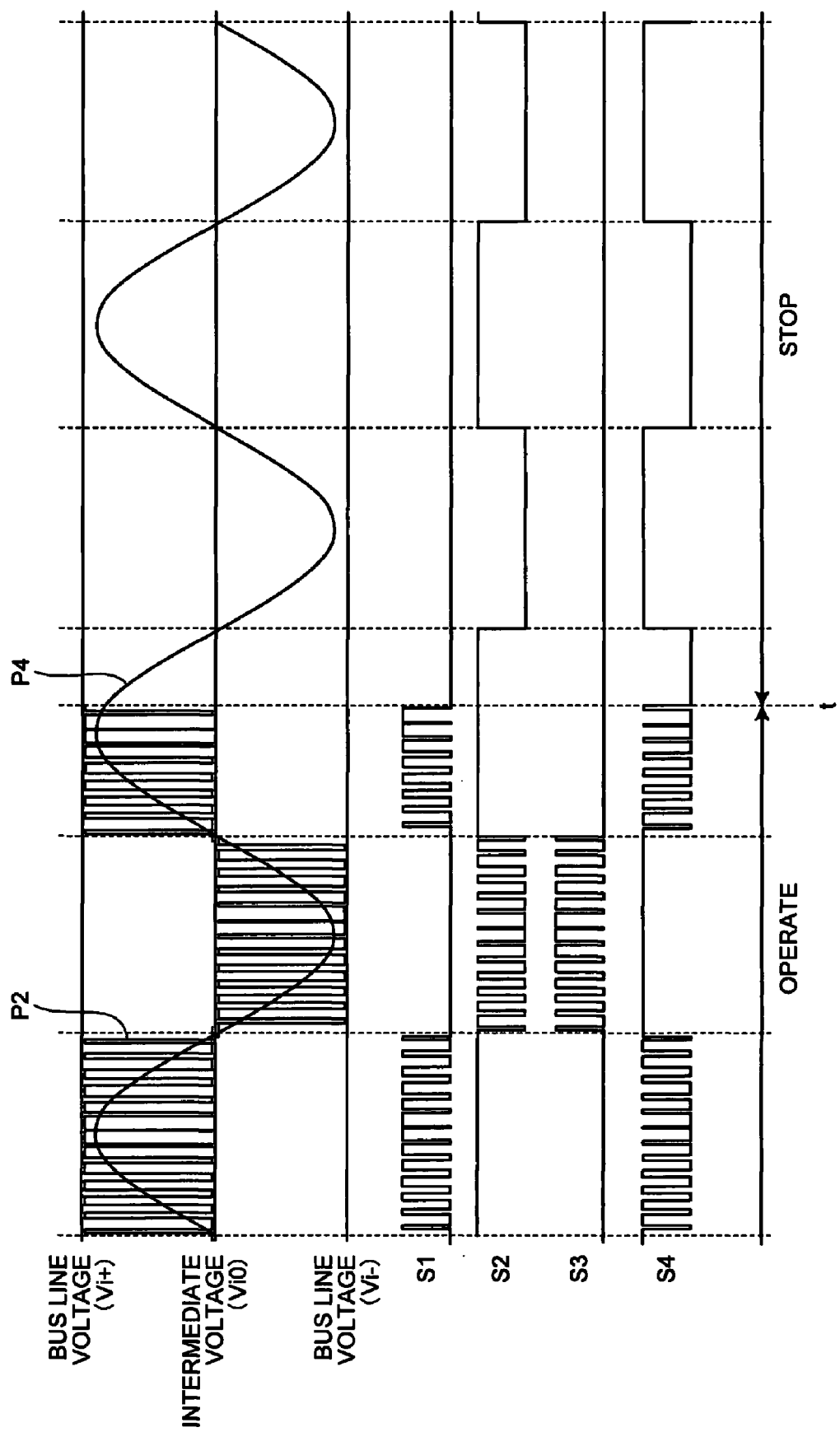
FIG. 9 is a relevant waveform diagram for explaining an operation of the power converting apparatus for system connection shown in FIG. 8.
Figure 10:
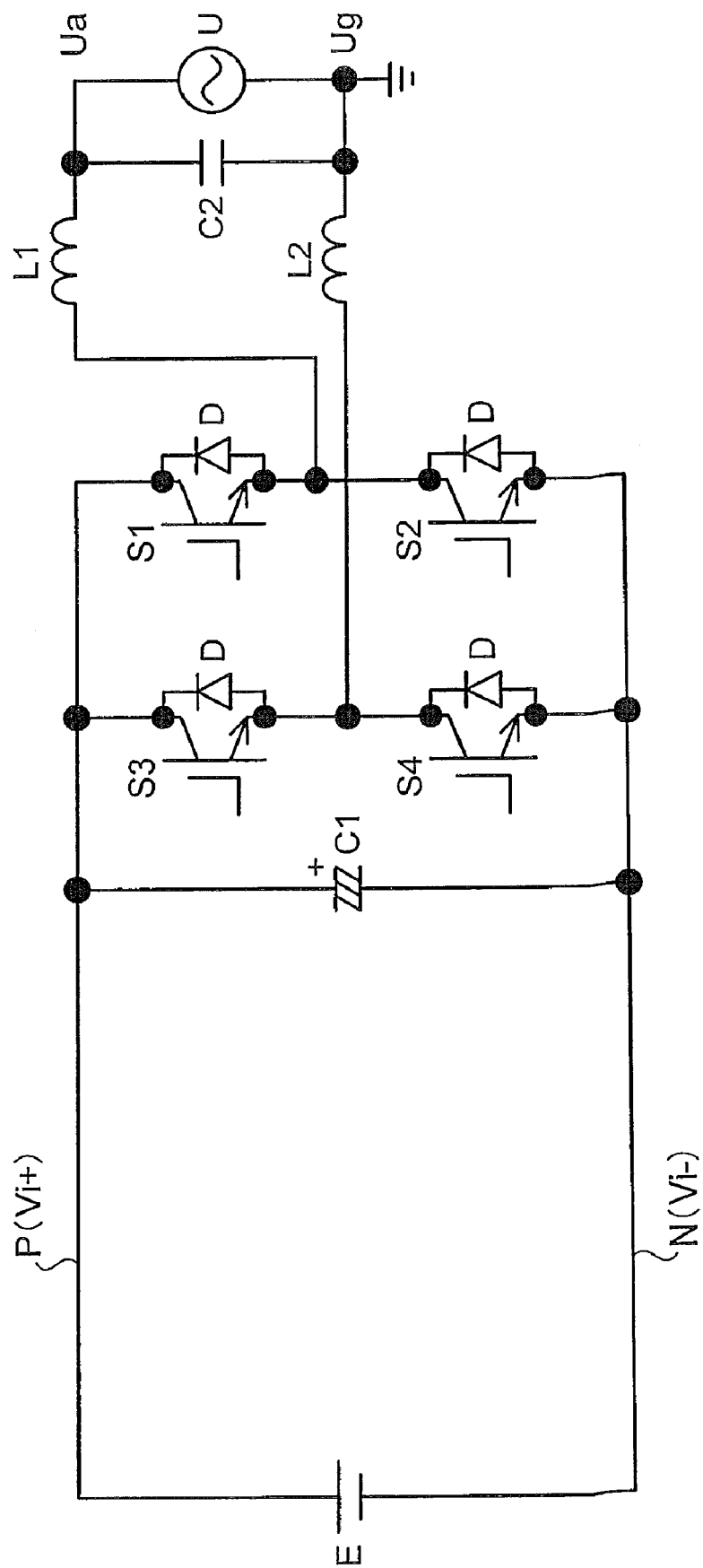
FIG. 10 is a block diagram of a configuration example (part one) of a conventional power converting apparatus for system connection.

A power converting apparatus 10f according to the sixth embodiment shown in FIG. 9 includes an operation control circuit 38 in addition to the operation control circuit 14 in the power converting apparatus 10a shown in FIG. 1 (the first embodiment), for example. The operation control circuit 38 has a function of controlling the operation stop according to the sixth embodiment, in addition to the function of the operation control circuit 14 according to the first embodiment.

The control method of operation stop according to the sixth embodiment is explained with reference to FIG. 9. FIG. 9 is a relevant waveform diagram for explaining the power converting apparatus shown in FIG. 8. In FIG. 9, the left side of time t shows an operation state that the four switching elements S1 to S4 are on/off drive controlled in the sequence shown in FIG. 3, and the right side of time t shows a control sequence of stopping the operation of the four switching elements S1 to S4.

In stopping the operation at time t, when the four switching elements S1 to S4 are simultaneously off-operation controlled in the state that a current flows to the reactor L1 of the smoothing circuit 12, energy that biases the flowing current in the same direction is stored in the reactor L1 of the smoothing circuit 12. Therefore, a high voltage is applied to the switching element S2 or the switching element S4, in some cases.

For example, when the four switching elements S1 to S4 are simultaneously off-operation controlled in the positive half cycle during which a current flows in the reactor L1 in the direction of the system power source U, the voltage decreases at the inverter output end P2, and voltage is drawn to the same voltage as the voltage Vi− at the negative electrode side. Therefore, there is a possibility that a high voltage that is the addition of an absolute value of the voltage Vi+ at the positive electrode side and an absolute value of the voltage Vi− at the negative electrode side is applied to the switching element S2, as a maximum value.

As shown in FIG. 9, the switching element S1 at the direct-current power source E of the positive electrode arm and the switching element S3 at the direct-current power source E of the negative electrode arm are off-operation controlled synchronously with time t of operation stop. The switching element S2 at the system power source U of the positive electrode arm is controlled in the on-operation state, and the switching element S4 at the system power source U of the negative electrode arm is off-operation controlled, in the positive half cycle, respectively. On the other hand, the switching element S2 is controlled in the off-operation state, and the switching element S4 is on-operation controlled, in the negative half cycle, respectively, and this control is repeated by a predetermined number of cycles.

When the above control is carried out, because the switching element S2 is in the on-operation state in the positive half cycle during which the current is flowing in the reactor L1 toward the system power source U, a current path is formed from the grounding wire G to the diode D1, the switching element S2, and the non-grounded phase Ua of the system power source U. The voltage level at the inverter output end P2 becomes a neutral voltage (Vi0), and the energy stored in the reactor L1 can be attenuated or extinguished. Therefore, the occurrence of the above abnormal voltage in the switching element S2 can be avoided.

Similarly, because the switching element S4 is in the on-operation state in the negative half cycle during which the current is flowing in the reactor L1 toward the direct-current power source U, a current path is formed from the inverter output end P to the switching element S4, the diode D2, and the grounding wire G. The energy stored in the reactor L1 can be attenuated or extinguished. Therefore, the occurrence of the abnormal voltage in the switching element S4 can be avoided.

As described above, according to the sixth embodiment, in stopping the operation, each switching element at the system power source in the positive electrode arm and the negative electrode arm is on/off controlled in each cycle to the direction of extinguishing the energy stored in the reactor of the smoothing circuit. Therefore, the operation can be stopped without applying a large voltage to each switching element at the system power source side in the positive electrode arm and the negative electrode arm. In other words, the power converting apparatus that can repeat and stop the operation without causing a trouble in the switching element can be achieved.

While the application example to the power converting apparatus according to the first embodiment is explained in the sixth embodiment, it is needless to mention that the invention can be similarly applied to the power converting apparatus according to the second to the fifth embodiments.

INDUSTRIAL APPLICABILITY

As described above, the power converting apparatus for system connection according to the present invention is useful to realize a system connection of executing an adverse current flow to a commercial power system having one phase as a grounding wire, in high power conversion efficiency, by keeping stabilization and a positive and negative balance of current and voltage of the output alternate-current power, without passing a leak current even when a direct-current power generation facility has a large grounding capacitance like that of a solar cell.

The power converting apparatus for system connection according to the present invention is also useful to repeat and stop operations, without causing a trouble in the switching element.

The invention claimed is:

1. A power converting apparatus comprising:
   two capacitors that are connected in series between a positive electrode and a negative electrode of a direct-current power generation facility so as to equally bear a direct-current voltage output from the direct-current power generation facility, wherein a point of connection between the two capacitors is connected to a grounded wire of a single-phase commercial power system, the commercial power system having two lines via which power is distributed to consumers, with one of said lines being the grounded wire;

an inverter unit including two series connected switching elements connected between an output terminal and a positive electrode side of the series circuit of the two capacitors, and two series connected switching elements connected between said output terminal and a negative electrode side of the series circuit of the two capacitors, and a point of connection between the two switching elements at the positive electrode side and a point of connection between the two capacitors being connected to each other by a first clamp diode, and a point of connection between the two switching elements at the negative electrode side and a point of connection between the two capacitors being connected to each other by a second clamp diode;

a smoothing circuit that connects the output terminal of the inverter unit to the ungrounded power supply line from the commercial power system;

a current detector that detects an alternate current flowing through one of the ungrounded power supply line and the grounded wire, or a system voltage detector that directly detects an alternate voltage at the grounded wire; and an operation controller that controls the generation of a pulse-width-modulation signal applied to the four switching elements of the inverter so as to minimize a difference between a current value detected by the current detector and a target current value, or minimize a difference between a voltage value detected by the system voltage detector and a target voltage value, in the process of on/off controlling the four switching elements in a predetermined order and outputting alternate-current power corresponding to a frequency and a voltage of the commercial power system from the inverter output terminal;

wherein in stopping the operation in the control of the inverter unit, the operation controller controls the switching elements connected to both the positive electrode side and the negative electrode side to an off-operation state, and controls the switching elements connected to the inverter output terminal such that the switching element at the positive electrode side is set to an on-operation state and the switching element at the negative electrode side is set to an off-operation state, in a positive half cycle of the system, respectively, and the switching element at the positive electrode side is set to an off-operation state and the switching element at the negative electrode side is set to an on-operation state, in a negative half cycle of the system, respectively.

2. A power converting apparatus comprising:

two capacitors that are connected in series between a positive electrode and a negative electrode of a direct-current power generation facility so as to equally bear a direct-current voltage output from the direct-current power generation facility, wherein a point of connection between the two capacitors is connected to a grounded wire of a single-phase commercial power system, the commercial power system having two lines via which power is distributed to consumers, with one of said lines being the grounded wire;

an inverter unit including two series connected switching elements connected between an output terminal and a positive electrode side of the series circuit of the two capacitors, and two series connected switching elements connected between said output terminal and a negative electrode side of the series circuit of the two capacitors, and a point of connection between the two switching elements at the positive electrode side and a point of connection between the two capacitors being connected to each other by a first clamp diode, and a point of connection between the two switching elements at the negative electrode side a point of connection between the two capacitors being connected to each other by a second clamp diode;

a smoothing circuit that connects the output terminal of the inverter unit to the ungrounded power supply line from the commercial power system;

a first direct-current voltage detector that detects a voltage across the capacitor connected to the positive electrode side of the direct-current generation facility;

a second direct-current voltage detector that detects a voltage across the capacitor connected to the negative electrode side of the direct-current generation facility;

a current detector that detects an alternate current flowing through one of the ungrounded power supply line and the grounded wire, or a system voltage detector that directly detects an alternate voltage at the grounded wire; and an operation controller that controls in parallel the generation of a pulse-width-modulation signal so that a difference between two voltages detected by the first and second direct-current voltage detectors is accommodated within a constant range of values, at the time of controlling the generation of the pulse-width-modulation signal applied to the four switching elements of the inverter so as to minimize a difference between a current value detected by the current detector and a target current value, or minimize a difference between a voltage value detected by the system voltage detector and a target voltage value, in the process of on/off controlling the four switching elements in a predetermined order and outputting alternate-current power corresponding to a frequency and a voltage of the commercial power system from the inverter output terminal.

3. The power converting apparatus according to claim 2, wherein in stopping the operation in the control of the inverter unit, out of two switching elements at the positive electrode side and two switching elements at the negative electrode side, the operation controller controls the switching elements connected to both the positive electrode side and the negative electrode side to an off-operation state, and controls the switching elements connected to the inverter output terminal such that the switching element at the positive electrode side is set to an on-operation state and the switching element at the negative electrode side is set to an off-operation state, in a positive half cycle of the system, respectively, and the switching element at the positive electrode side is set to an off-operation state and the switching element at the negative electrode side is set to an on-operation state, in a negative half cycle of the system, respectively.

4. A power converting apparatus comprising:

a first booster circuit that includes a first capacitor and a first reactor of which one end respectively is connected to a positive electrode side of a direct-current power generation facility, and a first switching element of which one end is connected to the other end of the first reactor, with the other end of the first capacitor and the other end of the first switching element being connected respectively to a node which is connected to a grounded wire of a single-phase commercial power system, the commercial power system having two lines via which power is distributed to consumers, with one of the lines being the grounded wire;

a second booster circuit that includes a second capacitor and a second reactor of which one end respectively is connected to a negative electrode side of the direct-current power generation facility, and a second switching element of which one end is connected to the other end of the second reactor, with the other end of the second capacitor and the other end of the second switching element being connected respectively to the node;

two capacitors that are connected in series between a cathode of a first adverse-flow-preventing diode whose anode is connected to the other end of the first reactor and an anode of a second adverse-flow-preventing diode whose cathode is connected to the other end of the second reactor, so as to equally bear direct-current voltages boosted by the first and the second booster circuits, with a point of connection of said series-connected capacitors being connected to the node;

a first direct-current voltage detector that detects a voltage across the capacitor connected between the cathode of the first adverse-flow-preventing diode and the node;

a second direct-current voltage detector that detects a voltage across the capacitor connected between the anode of the second adverse-flow-preventing diode and the node;

an inverter unit including two series-connected switching elements connected between an output terminal and one end of the series circuit of the two capacitors, and two series-connected switching elements connected between the output terminal and the other end of the series circuit of the two capacitors, wherein the connection between the two switching elements at said one end of the series connection between the two capacitors is connected to the node by a first clamp diode, and the connection between the two switching elements at said other end of the series connection between the two capacitors is connected to the node by a second clamp diode;

a smoothing circuit that connects the output terminal of the inverter unit to the ungrounded power supply line from the commercial power system; and an operation controller that on/off controls the first and the second switching elements to boost voltages at both ends of the series circuit of the two capacitors to a voltage necessary to generate an adverse current flow, based on voltages detected by the first and second direct-current voltage detectors, on/off controls the switching elements of the inverter in a predetermined order to maintain the voltages at both ends of the series circuit of the two capacitors at a voltage necessary to generate an adverse current flow, in the process of outputting alternate-current power corresponding to a frequency and a voltage of the commercial power system from the inverter output terminal;

wherein in stopping the operation in the control of the inverter unit, the operation controller controls the switching elements connected to the series-connected capacitors to an off-operation state, and controls the switching elements connected to the inverter output terminal such that the switching element at one side is set to an on-operation state and the switching element at the other side is set to an off-operation state, in a positive half cycle of the system, respectively, and the switching element at the one side is set to an off-operation state and the switching element at the other side is set to an on-operation state, in a negative half cycle of the system, respectively.

5. The power converting apparatus according to claim 4, wherein the first reactor and the second reactor are magnetically connected to each other.

* * * * *